(12) United States Patent
Yoo

(10) Patent No.: US 11,875,337 B2
(45) Date of Patent: *Jan. 16, 2024

(54) SMART CARD FOR PROVIDING FINANCIAL TRANSACTION BY USING VIRTUAL CARD NUMBER

(71) Applicant: SSenStone Inc., Seoul (KR)

(72) Inventor: Chang Hun Yoo, Seoul (KR)

(73) Assignee: SSenStone Inc., Seoul (KR)

( * ) Notice: Subject to any disclaimer, the term of this patent is extended or adjusted under 35 U.S.C. 154(b) by 367 days.

This patent is subject to a terminal disclaimer.

(21) Appl. No.: 16/926,323

(22) Filed: Jul. 10, 2020

(65) Prior Publication Data

US 2020/0342445 A1 Oct. 29, 2020

Related U.S. Application Data

(63) Continuation-in-part of application No. 15/874,159, filed on Jan. 18, 2018, now abandoned.

(30) Foreign Application Priority Data

Aug. 9, 2017 (KR) .................. 10-2017-0100953
Sep. 5, 2017 (KR) .................. 10-2017-0113479

(51) Int. Cl.
*G06Q 20/34* (2012.01)
*G05B 15/02* (2006.01)
(Continued)

(52) U.S. Cl.
CPC .......... *G06Q 20/351* (2013.01); *G05B 15/02* (2013.01); *G06Q 20/1085* (2013.01); *H04L 63/0838* (2013.01)

(58) Field of Classification Search
CPC .............. G06Q 20/351; G06Q 20/102; G06Q 20/4018; G06Q 20/1085; G06Q 40/00; G05B 15/02; H04L 9/0863; H04L 63/0838
(Continued)

(56) References Cited

U.S. PATENT DOCUMENTS

| 4,720,860 A | 1/1988 | Weiss |
| 2009/0048971 A1 | 2/2009 | Hathaway et al. |

(Continued)

FOREIGN PATENT DOCUMENTS

| JP | 2002-298055 A | 10/2002 |
| JP | 2002-342688 A | 11/2002 |

(Continued)

OTHER PUBLICATIONS

An Office Action mailed by the Japanese Patent Office dated Nov. 6, 2018, which corresponds to Japanese Patent Application No. 2018-005932 and is related to U.S. Appl. No. 15/874,159.

(Continued)

*Primary Examiner* — Christopher Bridges
*Assistant Examiner* — Timothy T. Hsieh
(74) *Attorney, Agent, or Firm* — Studebaker & Brackett PC

(57) ABSTRACT

A system, a method, and a program for providing a financial transaction by a virtual card number, a virtual card number generating device, and a virtual card number verifying device are provided. The method includes receiving, by a virtual card number verifying means, a virtual card number provided from a virtual card number generating means, extracting, by the virtual card number verifying means, a plurality of detailed codes included in the virtual card number, searching, by the virtual card number verifying means, for a storage location of a real card number based on (Continued)

the plurality of detailed codes, and proceeding, by the virtual card number verifying means, with the financial transaction or requesting, by the virtual card number verifying means, to proceed with the financial transaction using the real card number extracted from the storage location.

5 Claims, 15 Drawing Sheets

(51) Int. Cl.
*G06Q 20/10* (2012.01)
*H04L 9/40* (2022.01)
(58) Field of Classification Search
USPC .................................................. 705/35, 44
See application file for complete search history.

(56) References Cited

U.S. PATENT DOCUMENTS

| | | | |
|---|---|---|---|
| 2010/0332334 A1* | 12/2010 | Kilfoil | .............. G06Q 20/04 705/16 |
| 2012/0310826 A1 | 12/2012 | Chatterjee | |
| 2014/0019352 A1 | 1/2014 | Shrivastava | |
| 2015/0134540 A1* | 5/2015 | Law | .............. G06Q 20/229 705/72 |
| 2016/0275488 A1 | 9/2016 | Liu et al. | |
| 2017/0017938 A1* | 1/2017 | Lee | .............. G06Q 20/3223 |
| 2017/0064511 A1 | 3/2017 | McCormick | |
| 2017/0185991 A1* | 6/2017 | Park | .............. G06Q 20/351 |
| 2018/0068295 A1* | 3/2018 | Hwang | .............. G06Q 20/385 |
| 2019/0205547 A1* | 7/2019 | Horvath | .............. G06Q 20/3674 |

FOREIGN PATENT DOCUMENTS

| | | |
|---|---|---|
| JP | 2008-204248 A | 9/2008 |
| JP | 2013-015881 A | 1/2013 |
| JP | 2015-507277 A | 3/2015 |
| JP | 2015-510628 A | 4/2015 |
| KR | 10-1316466 B1 | 10/2013 |

OTHER PUBLICATIONS

The extended European search report issued by the European Patent Office dated Apr. 17, 2018, which corresponds to European Patent Application No. 18152466.1-1217 and is related to U.S. Appl. No. 15/874,159.

* cited by examiner

```
Receive first virtual card number from virtual card number generating
means at virtual card number verifying means
[S200]
```
↓
```
Extract a plurality of detailed codes included in first virtual card
number at virtual card number verifying means
[S400]
```
↓
```
Search for storage location of real card number based on the plurality
of detailed codes at virtual card number verifying means
[S1000]
```
↓
```
Proceed with financial transaction or request to proceed with financial
transaction using real card number extracted from the storage location
[S1200]
```
↓
```
Receive second virtual card number corresponding to count in which
financial transaction cancellation is requested to virtual card number
generating means
[S1300]
```
↓
```
Search for real card number corresponding to second virtual card
number at virtual card number verifying means
[S1400]
```
↓
```
Cancel previous financial transaction for real card number
[S1500]
```

SMART CARD FOR PROVIDING FINANCIAL TRANSACTION BY USING VIRTUAL CARD NUMBER

CROSS-REFERENCE TO RELATED APPLICATIONS

This application is a continuation-in-part of U.S. patent application Ser. No. 15/874,159, filed on Jan. 18, 2018, which claims priority under 35 U.S.C. § 119 to Korean Patent Application Nos. 10-2017-0100953 filed on Aug. 9, 2017, and 10-2017-0113479 filed on Sep. 5, 2017, in the Korean Intellectual Property Office. The disclosures of the above-listed applications are hereby incorporated by reference herein in their entirety.

BACKGROUND

The present disclosure relates to an electrical circuit device and method for testing a code combination.

Embodiments of the inventive concept described herein relate to a system, method, and program for providing a financial transaction by a virtual card number, a virtual card number generating device, and a virtual card number verifying device, and more particularly, relate to a system, method, and program for generating a virtual card number generated not to be duplicated for each time, searching for a real card number based on the virtual card number, and proceeding with the financial transaction, an apparatus for generating the virtual card number which is not duplicated for each time, and an apparatus for searching for the real card number based on the virtual card number and proceeding with the financial transaction.

Code-type data may be used in many areas. An Internet personal identification number (IPIN), a resident registration number, or the like for identifying a user as well as a card number used upon payment and an account number may be code-type data.

However, there may be many accidents where such code data is hacked in a process of using the code data. In case of a card number, since a real card number is written on a card surface without change, the card number may be visually flowed out to others. A card number may be hacked while it is transmitted to a POS device without change upon payment using a magnetic portion.

There have been many attempts to use a virtual card number such that a real card number is not hacked without change. However, there is a need for data for identifying a user to search for a real card number corresponding to a virtual card number. For example, in case of a one time password (OTP), a code is changed and generated per time, but a log-in procedure is needed to determine an algorithm assigned to a user. Further, it is difficult to apply the OTP to various areas.

Therefore, there is a need for technologies for searching for a real card number based on a virtual card number changed in real time without providing identification information about a user or device, corresponding to a real card number.

SUMMARY

Embodiments of the inventive concept provide a system, method, and program for providing a financial transaction by a virtual card number, a virtual card number generating device, and a virtual card number verifying device, for searching for a real card number based on the virtual card number without a separate procedure for identifying a virtual card number generating means.

Embodiments of the inventive concept provide a system, method, and program for providing a financial transaction by a virtual card number, a virtual card number generating device, and a virtual card number verifying device, for providing a virtual card number newly generated at intervals of a unit count without being duplicated and generated in the entire period by all virtual card number generating means.

According to an aspect of an embodiment, a method for providing a financial transaction by a virtual card number may include receiving, by a virtual card number verifying means, the virtual card number provided from a virtual card number generating means, extracting, by the virtual card number verifying means, a plurality of detailed codes included in the virtual card number, searching, by the virtual card number verifying means, for a storage location of a real card number based on the plurality of detailed codes, and proceeding, by the virtual card number verifying means, with the financial transaction or requesting, by the virtual card number verifying means, to proceed with the financial transaction using the real card number extracted from the storage location. The virtual card number verifying means and the virtual card number generating means may include the same virtual card number generation function. The virtual card number may be generated by combining a fixed code with the plurality of detailed codes depending on a specific rule. The fixed code may be a code, combined to a predetermined location in the virtual card number, for determining a card issuer or a card type corresponding to the real card number. The plurality of detailed codes may include a first code for setting a start point for searching for the storage location and a second code for setting a search path from the start point to the storage location depending on a specific search scheme and may be respectively generated by a plurality of detailed code generation functions included in the virtual card number generation function. The first code and the second code may be changed per unit count. The unit count may be set at a specific time interval and may be changed as the time interval elapses.

The virtual card number verifying means may include a storage location search algorithm configured to extract a point moved along a search path corresponding to the second code from the start point corresponding to the first code as a point matched to the storage location if a virtual card number normally generated per unit count is received.

The receiving of the virtual card number may include, if a card issuer server includes the virtual card number verifying means, receiving, by the virtual card number verifying means, the virtual card number classified as corresponding to a specific card issuer based on the fixed code from a payment service server. The payment service server may receive the virtual card number from a financial transaction terminal. If the card issuer server includes the virtual card number verifying means, the extracting of the plurality of detailed codes may include determining a card type based on the fixed code and extracting the plurality of detailed codes using the virtual card number generation function corresponding to the card type. The virtual card number generation function may include a detailed code combination function of combining the plurality of detailed codes depending on a specific rule. If the card issuer server includes the virtual card number verifying means, the searching for the storage location of the real card number may include searching for the storage location of the real card number based on the plurality of detailed codes using the storage location search algorithm corresponding to the card type.

The virtual card number may further include a virtual security code corresponding to digits of a card security code. The method may further include verifying, by the virtual card number verifying means, the virtual card number by determining whether a reception security code received from the virtual card number generation means is identical to a generation security code generated in the virtual card number verifying means.

The virtual card number may be assigned an issuer identification number of the real card number as the fixed code in the same location. All or some of the number of digits except for the fixed code may be divided to be assigned as digits of the first code and the second code.

If the first code or the second code of N (N is a natural number) digits is generated with M (M is a natural number) characters, each of the plurality of detailed codes may be matched to different $M^N$ codes per unit count. The virtual card number generation function may include a first function or a second function for sequentially providing the first code or the second code depending on a specific matching rule per unit count.

The first code may be generated based on a unit count which elapses from an initial time started to issue the real card number at the virtual card number verifying means. The second code may be generated based on a unit count which elapses from a time when a separate real card number is issued.

The searching for the storage location of the real card number may include, if the storage location search algorithm moves a pointer based on the first code and the second code on one track, moving the pointer to a point on a track, the point corresponding to the first code in the virtual card number received from the virtual card number generating means, setting a location corresponding to the first code to a search start point and searching for a point matched to the storage location of the real card number by returning a track by the number of counts corresponding to the second code, and extracting the real card number included in the storage location of the real card number.

The searching for the storage location of the real card number may include, if the storage location search algorithm performs rolling motion of a k-gon on a track where k (k is $M^N$) codes are sorted such that a vertex corresponds to a point where each code is arranged, performing the rolling motion of the k-gon to a point on the track, the point corresponding to the first code in the virtual card number received from the virtual card number generating means, setting a location corresponding to the first code to a search start point and searching for a storage location in an arrangement state of the k-gon based on the second code depending on a search scheme applied to the second code, the storage location being matched to each vertex of the k-gon, and extracting the real card number included in the storage location.

The method may further include, if a request to newly generate a real card number in a specific count is received from a specific virtual card number generating means, storing the real card number in a storage location corresponding to a specific vertex of the k-gon in the specific count, the specific vertex being a point where the track and the k-gon are met in the specific count.

The method may further include, if a request to cancel a financial transaction is received from a specific virtual card number generating means, receiving, by the virtual card number verifying means, a virtual card number corresponding to a count in which financial transaction cancellation is requested to the virtual card number generating means, searching, by the virtual card number verifying means, for a real card number corresponding to the virtual card number, and cancelling, by the virtual card number verifying means, a previous financial transaction for the real card number.

The virtual card number may be configured with the first code and the second code generated based on a count in which a virtual security code is added to a time when the real card number is issued or a time when a financial transaction request is received. The virtual security code may have a code value of a specific-digit number, generated through a one time password (OTP) function based on an eigen value and a card security code of the virtual card number generating means and may fail to be separately provided from the virtual card number generating means to the virtual card number verifying means. The method may further include verifying whether the virtual card number generating means is normally issued using a generation virtual security number calculated based on a time value in a specific range from a time when the virtual card number verifying means receives the second code and the virtual card number.

According to another aspect of an embodiment, a program for providing a financial transaction by a virtual card number may be combined with hardware, execute the method for providing the financial transaction by the virtual card number, and be stored in a medium.

According to another aspect of an embodiment, a virtual card number generating device may include a detailed code generating unit configured to generate one or more detailed codes, a virtual card number generating unit configured to generate a virtual card number by combining the one or more detailed codes, and a virtual card number providing unit configured to output the virtual card number to the outside to provide the virtual card number to a virtual card number verifying server. The virtual card number verifying means and the virtual card number generating means may include the same virtual card number generation function. The virtual card number may be generated by combining a fixed code with a plurality of detailed codes depending on a specific rule. The fixed code may be a code, combined to a predetermined location in the virtual card number, for determining a card issuer or a card type corresponding to the real card number. The plurality of detailed codes may include a first code for setting a start point for searching for a storage location and a second code for setting a search path from the start point to the storage location depending on a specific search scheme and may be respectively generated by a plurality of detailed code generation functions included in the virtual card number generation function. The first code and the second code may be changed per unit count. The unit count may be set at a specific time interval and may be changed as the time interval elapses.

According to another aspect of an embodiment, a virtual card number verifying server may include a receiving unit configured to receive the virtual card number provided from a virtual card number generating device, a detailed code extracting unit configured to extract a plurality of detailed codes included in the virtual card number, and a real card number search unit configured to search for a storage location of the real card number based on the plurality of detailed codes. The virtual card number verifying server and the virtual card number generating device may include the same virtual card number generation function. The virtual card number may be generated by combining a fixed code with the plurality of detailed codes depending on a specific rule. The fixed code may be a code, combined to a predetermined location in the virtual card number, for determining a card issuer or a card type corresponding to the real card number. The plurality of detailed codes may include a first code for setting, by the real card number search unit, a start point for searching for the storage location and a second code for setting, by the real card number search unit, a search path from the start point to the storage location depending on a specific search scheme. The real card number search unit may include a storage location search algorithm configured to adjust the storage location of the real card number to be matched with the first code and the second code which are changed and provided per unit count from the virtual card number generating device. If a virtual card number normally generated per unit count is received, a point moved along a search path corresponding to the second code from the start point corresponding to the first code may be calculated as the storage location. The unit count may be set at a specific time interval and may be changed as the time interval elapses.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIG. 15 is a flowchart illustrating a method for providing a financial transaction by a virtual card number, further including a financial transaction cancellation process, according to an embodiment of the inventive concept.

DETAILED DESCRIPTION

Figure 1:
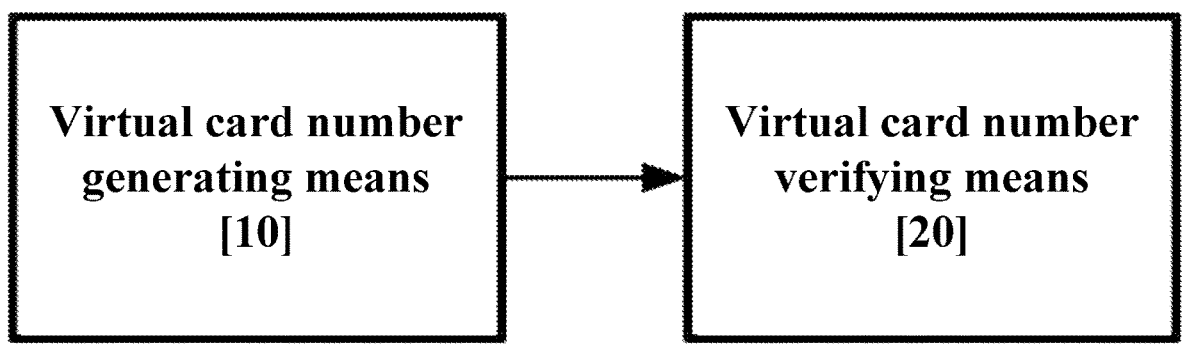
FIG. 1 is a block diagram illustrating a configuration of a system for providing a financial transaction by a virtual card number according to an embodiment of the inventive concept.

Hereinafter, a description will be given in detail of exemplary embodiments of the inventive concept with reference to the accompanying drawings. Advantages, features, and methods of accomplishing the same will become apparent with reference to embodiments described in detail below together with the accompanying drawings. However, the inventive concept is not limited by embodiments disclosed hereinafter, and may be implemented in various forms. Rather, these embodiments are provided to so that this disclosure will be through and complete and will fully convey the concept of the invention to those skilled in the art, and the inventive concept will only be defined by the appended claims. Like reference denotations refer to like elements throughout the specification.

Unless otherwise defined herein, all terms (including technical and scientific terms) used in the specification may have the same meaning that is generally understood by a person skilled in the art. Also, terms which are defined in a dictionary and commonly used should be interpreted as not in an idealized or overly formal detect unless expressly so defined.

Terms used in the specification are used to describe embodiments of the inventive concept and are not intended to limit the scope of the inventive concept. In the specification, the terms of a singular form may include plural forms unless otherwise specified. The expressions "comprise" and/or "comprising" used herein indicate existence of one or more other elements other than stated elements but do not exclude presence of additional elements.

The term "financial transaction" in the specification may refer to a procedure performed with a financial institution. The term "financial transaction" may include card payment, a deposit and withdrawal from a bank account, or the like.

The term "character" in the specification may be an element configuring a code and may include all or some of an uppercase alphabet, a lowercase alphabet, a numeral, a special character, and the like.

The term "code" in the specification may refer to a string where characters are arranged.

The term "card number" in the specification may be used for a financial transaction such as payment and may refer to a number which is assigned to a card and is transmitted to a card issuer in a situation such as payment or payment cancellation.

The term "real card number" in the specification may refer to a number assigned to a card of a specific user at a card issuer. In other words, the term "real card number" may refer to a number assigned to a general real card, a mobile card, or the like.

The term "virtual card number" in the specification may be a card number temporarily generated connected to a real card number and may be a code of specific digits configured with a character including a number.

The term "detailed code" in the specification may refer to a partial code included in a virtual card number. In other words, if the virtual card number is generated by combining a plurality of separately generated codes, the detailed code may refer to a separate code which is separately generated and configures the virtual card number.

The term "unit count" in the specification may be a unit defined as being set at a specific time interval and being changed as the time interval elapses. For example, 1 count may be used by being set to a specific time interval (e.g., 1.5 seconds).

The term "virtual card number generation function" in the specification may refer to a function used to generate a virtual card number.

The term "smart card" in the specification may refer to a card, a card number of which is changed and output.

The term "rolling motion" in the specification may mean that an object performs a translation motion while rotating. In other words, the term "rolling motion" may mean that the object moves while performing a rotational motion and the translation motion together and may mean that the object moves while each point of the rotating object is in contact with a moving axis in turn.

A description will be given of a configuration of a real card number to describe a process of generating a virtual card number with which the real card number is replaced and searching for the real card number according to embodiments of the inventive concept.

The term "real card number" may include at least one of a card identification number, a card security code, or an expiration date. The card identification number may refer to a code assigned to identify a card issuer, a card type, and a card user. In general, the card identification number assigned to a card may be configured with a 15- or 16-digit number. In the case of a general card identification number being a 16-digit number, the first 6 digits may be configured as an issuer identification number (IIN) of a card, the next 9 digits may be configured as a code assigned to each card depending on any rule by each card issuer, and the remaining digit may be configured as a value of verifying a card identification number by a specific formula.

The card security code may be a code which is configured with a number of specific digits (e.g., 3 digits in Visa, Master Card and 4 digits in American Express) printed at one side of a card and is for verifying whether a card number is normal. In other words, if the card security number is 3 digits and if the card identification number is 16 digits, a 3-digit code of the card security code and a 16-digit code of the card identification number are encrypted/decrypted according to a specified rule. If corresponding values are identical to each other, it may be seen that a card is a normal card. The card security code may vary in name called per each card company. The card security code may be called a card verification value (CVV) in a Visa card, may be called a card validation code (CVC) in a Master card/JCB, and may be called a confidential identifier number or a card identification number (CID) in an American Express.

The expiration date may refer to a time limit when it is possible to issue and use a real card number. In general, the expiration date may be configured with a 4-digit code by assigning 2 digits to year/month. Since a real card number is included in a magnetic card without change, the entire card number is exposed due to only the reading of the magnetic card. Thus, recently, the use of the magnetic card is globally limited, and the magnetic card may be changed to a card with high security, such as an integrated circuit (IC) card. To apply another card with high security, a new terminal should be installed or a process should be changed to be different from a conventional process. Thus, there is a need for a method of applying the same process as a process which uses a conventional real card number and preventing a card number from being hacked. Particularly, there is a method of enhancing security while using a conventional magnetic card reader without change.

Hereinafter, a description will be given in detail of a system, method, and program for providing a financial transaction by a virtual card number, a virtual card number generating device 100, and a virtual card number verifying server 200 with reference to the accompanying drawings.

FIG. 1 is a block diagram illustrating a configuration of a system for providing a financial transaction by a virtual card number according to an embodiment of the inventive concept.

Figure 2:
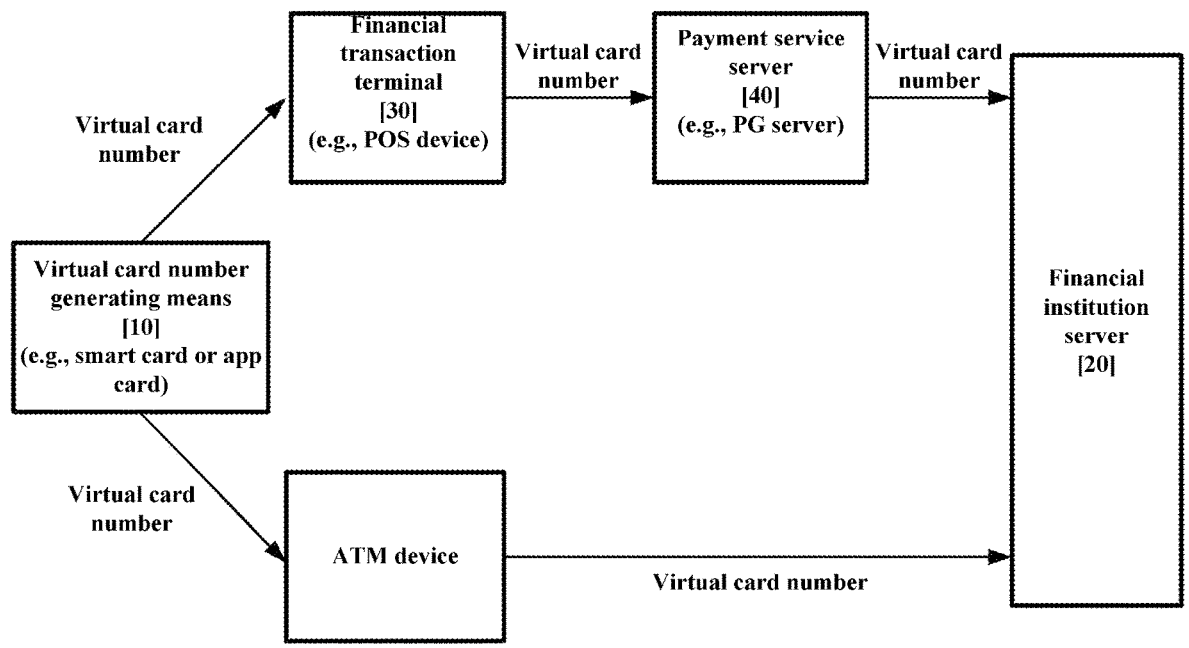
FIG. 2 is a block diagram illustrating a process of providing a virtual card number from a virtual card number generating means to a financial institution server according to an embodiment of the inventive concept.

FIG. 2 is a block diagram illustrating a process of providing a virtual card number from a virtual card number generating means to a financial institution server according to an embodiment of the inventive concept.

Referring to FIG. 1, the system for providing the financial transaction by the virtual card number may include a virtual card number generating means 10 and a virtual card number verifying means 20.

The virtual card number generating means 10 may play a role in generating a virtual card number including information for searching for a real card number at the virtual card number verifying means 20. In other words, the virtual card number generating means 10 may generate the virtual card number depending on a virtual card number generation function. In this case, since the virtual card number verifying means 20 searches for the real card number based on the virtual card number, the virtual card number generating means 10 may fail to store the real card number. Thus, the real card number may be prevented from being hacked through hacking of the virtual card number generating means 10 and the like. A description will be given in detail of the virtual card number generation function.

The virtual card number verifying means 20 may play a role in searching for the real card number code based on the virtual card number provided from the virtual card number generating means 10. The virtual card number verifying means 20 may store the same virtual card number generation function as the virtual card number generating means 10 to search for the real card number from the virtual card number received from the virtual card number generating means 10. A description will be given in detail of a manner of searching for the real card number based on the virtual card number at the virtual card number verifying means 20.

Further, the virtual card number verifying means 20 may play a role in verifying whether a virtual card number is a code normally generated by the virtual card number generating means 10. A description will be given in detail of a manner of determining whether the virtual card number is normal at the virtual card number verifying means 20.

The virtual card number verifying means 20 may receive the virtual card number from the virtual card number generating means 10 in various manners. As an embodiment, the virtual card number verifying means 20 may receive the virtual card number through wireless communication from the virtual card number generating means 10. For example, a virtual card number generating device 100 including the virtual card number generating means 10 includes a near field communication (NFC) antenna module, a Bluetooth module, or the like, the virtual card number generating means 10 may transmit a virtual card number to be transmitted to a virtual card number verifying server 200 to a financial transaction terminal 30 through communication of the financial transaction terminal 30. Further, as another embodiment, as a virtual card number generated by the virtual card number generating device 100 is directly input on a mobile terminal connected to the virtual card number verifying server 200 through communication (e.g., as a virtual card number is input to a webpage or a payment page of an application), the virtual card number verifying server 200 may receive the virtual card number. In this case, the virtual card number verifying means 200 may receive the virtual card number from another server which receives the virtual card number from the virtual card number generating means 10.

In detail, as shown in FIG. 2, if the virtual card number generating means 10 is a smart card payable on a payment terminal and if the virtual card number verifying means 20 is a card issuer server (e.g., the virtual card number verifying server) 20 including a virtual card number generation function, a point of sales (POS) device 30 may pay by the smart card which is the virtual card number generating means 10. The virtual card number verifying means 20 may receive a virtual card number from a payment gateway (PG) server 40 which receives the virtual card number from the POS device 30. In other words, the virtual card number verifying means 20 (e.g., a card issuer server) may receive the virtual card number rather than a real card number from the virtual card number generating means 10 using a conventional payment process. In other words, as will be described below, if the virtual card number is generated as a code of the same length as the real card number, a method for providing a financial transaction by a virtual card number according to embodiments of the inventive concept may be applied without being changed on a process which progresses from the virtual card number generating means 10 to the card issuer server including the virtual card number verifying means 20. Further, if a financial transaction is performed through an automatic teller machine (ATM) device by the smart card which is the virtual card number generating means 10, the virtual card number generating means 10 may provide the virtual card number generated as a code of the same length as the real card number to the ATM device. The financial institution server 20 may receive the virtual card number from the ATM device without change and may proceed with a financial transaction.

Further, as an embodiment, the virtual card number verifying means 20 and the virtual card number generating means 10 may include the same virtual card number generation function. As the virtual card number verifying means 20 and the virtual card number generating means 10 include the same virtual card number generation function, the virtual card number verifying means 20 may correctly extract a plurality of detailed codes in the virtual card number generated by the virtual card number generating means 10. Further, the virtual card number verifying means 20 may verify whether the received virtual card number is generated and received by the normal virtual card number generating means 10. In other words, the virtual card number verifying means 20 may perform verification by generating a code (i.e., a virtual card number or a specific detailed code) in the same condition as the virtual card number generating means 10 and comparing the generated code with a code (i.e., a virtual card number or a specific detailed code) received from the virtual card number generating means 10.

Figure 3:
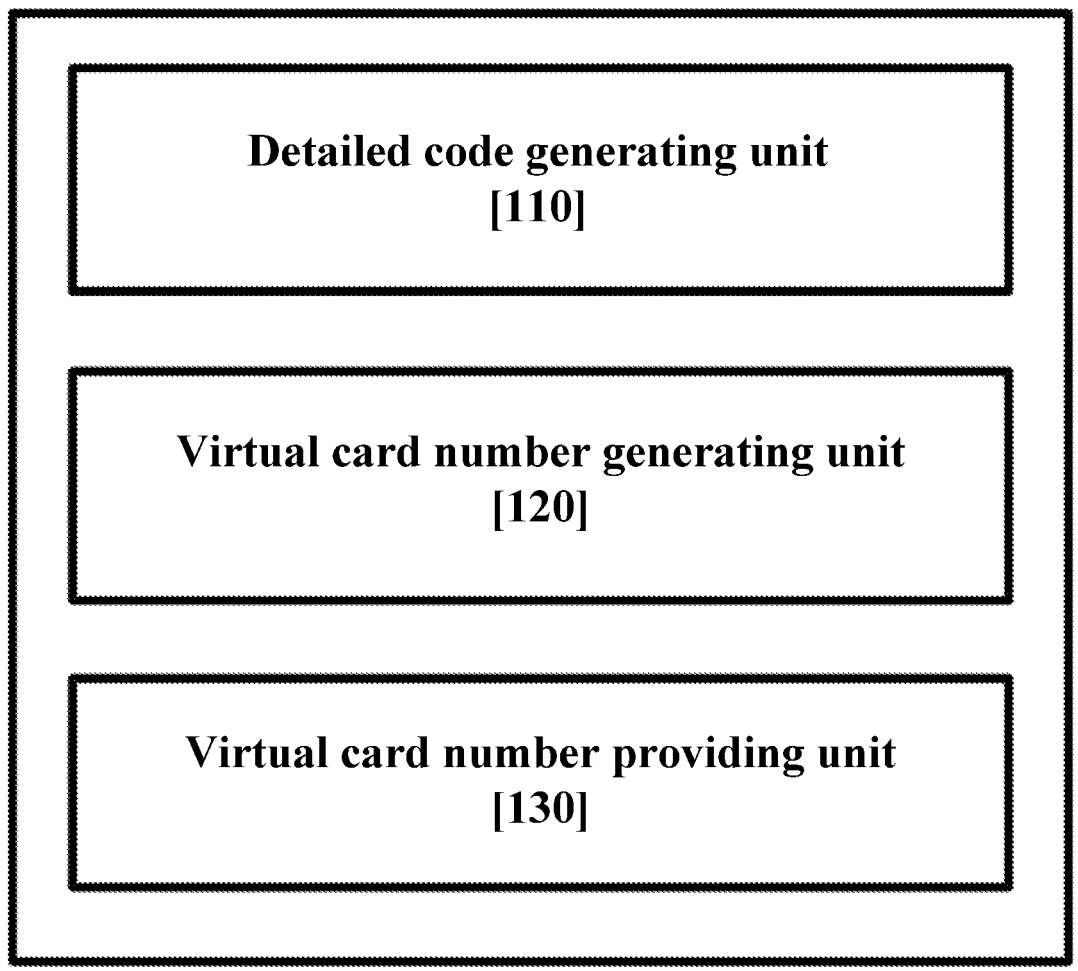
FIG. 3 is a block diagram illustrating a configuration of a virtual card number generating device according to an embodiment of the inventive concept.

FIG. 3 is a block diagram illustrating a configuration of a virtual card number generating device 100 according to another embodiment of the inventive concept.

Figure 4:
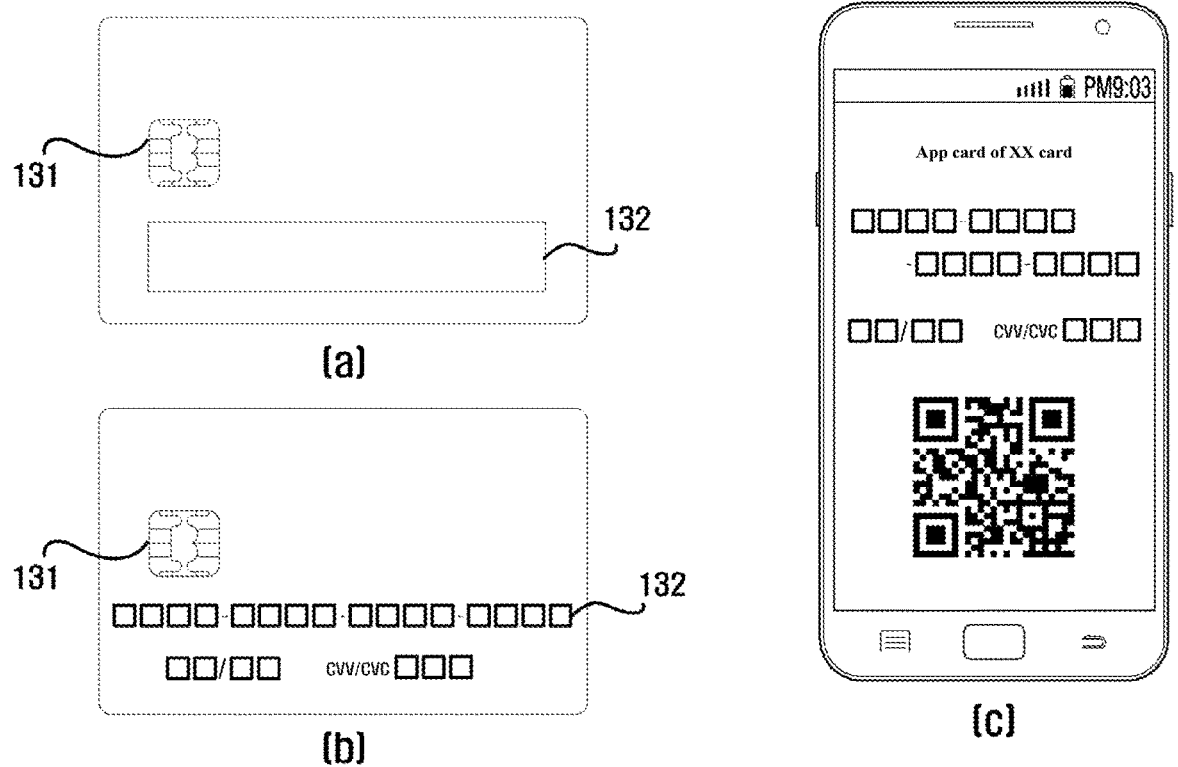
FIGS. 4A, 4B, and 4C are drawings illustrating a virtual card number generating device according to an embodiment of the inventive concept.

FIGS. 4A to 4C are drawings illustrating a virtual card number generating device according to an embodiment of the inventive concept.

Referring to FIG. 3, the virtual card number generating device 100 according to another embodiment of the inventive concept may include a detailed code generating unit 110, a virtual card number generating unit 120, and a virtual card number providing unit 130.

The virtual card number generating device 100 according to embodiments of the inventive concept may be a device in which a program corresponding to a virtual card number generating means 10 of FIG. 1 is embedded or installed. For example, the virtual card number generating device 100 may be a smart card in which the program corresponding to the virtual card number generating means 10 is embedded. Further, for example, the virtual card number generating device 100 may be a mobile terminal in which an app card application corresponding to the virtual card number generating means 10 is installed. The virtual card number generating device 100 may be each of various devices which generate a virtual card number and transmit the virtual card number other than the above-mentioned example.

The virtual card number generating unit 120 may play a role in generating a virtual card number by combining one or more detailed codes. As an embodiment, the virtual card number may be generated by combining a plurality of detailed codes depending on a specific rule. A virtual card number generation function may include a rule (i.e., a detailed code combination function) for combining the plurality of detailed codes.

A variety of manners may be applied to the manner of generating the one virtual card number by combining the plurality of detailed codes. As an example of the detailed code combination function, the virtual card number generating unit 120 may generate the virtual card number in a manner of alternately arranging a first code of N digits and a second code of the N digits. Further, as another example, the detailed code combination function may be a function of combining the second code after the first code. As a detailed code included in a virtual function is increased, the detailed code combination function may be generated in various manners.

The detailed code generating unit 110 may play a role in generating one or more detailed codes. A virtual card number generation function may include each detailed code generation function. For example, the virtual card number generation function may be to generate a plurality of detailed codes using a plurality of detailed code generation functions and generate a virtual card number using a detailed code combination function for combining the plurality of detailed codes.

As an embodiment, the detailed code generating unit 110 may include a first function and a second function as a detailed code generation function and may generate a first code and a second code. The first code and the second code may have correlation for searching for a storage location of a real card number in a virtual card number verifying means 20 of FIG. 1. However, the virtual card number generating device 100 may include the first function for generating the first code and the second function for generating the second code as the detailed code generation function for enhancing security and may fail to include data for correlation between the first code and the second code.

Further, as another embodiment, a virtual card number may include a fixed code which is not changed for distinguishing a group together with a plurality of detailed codes. The virtual card number verifying means 20 may include several virtual card number generation functions respectively corresponding to several groups. If receiving a virtual card number from the virtual card number generating device 100, the virtual card number verifying means 20 may search for a real card number based on a virtual card number generation function of a group to which the virtual card number generating device 100 belongs. If the virtual card number code does not include a fixed code and if the entire code includes only a detailed code newly generated whenever a unit count elapses, the virtual card number verifying means 20 may fail to determine a group to which the virtual card number generating device 100 belongs without separate information. Thus, the virtual card number generating device 100 may include the fixed code which is not changed for identifying a group.

For example, if a virtual card number generation function is assigned for each card type of a specific card issuer, the virtual card number generating device 100 may use the first 6 digits indicating a card issuer and a card type in a card number as a fixed code. The virtual card number verifying means 20 may identify a specific card type of a specific card issuer to which the same virtual card number generation function as the virtual card number generating device 100 is applied. In other words, the fixed code may be a code for determining a card issuer or a card type corresponding to the real card number.

Further, the fixed code may be combined to a predetermined location in the virtual card number. If a virtual card number generation function is assigned for each card type group, the virtual card number verifying means 20 may first extract the fixed code from the virtual card number and may then determine a card type group. Thus, the fixed code may be combined to a predetermined location in a virtual card number (e.g., the same location as an IIN of a real card number) to be detachable without a separate function.

Further, as an embodiment, the virtual card number generating device 100 may generate a detailed code to be a code of the same digits as a real card number by combining a plurality of detailed codes with a fixed code. To use a virtual card number while maintaining a conventional financial transaction system (e.g., a POS device and a PG server if a financial transaction is payment in a store) without change, the virtual card number generating device 100 should generate a code having the same digits as the real card number as the virtual card number. For this purpose, the virtual card number generating device 100 may divide digits except for a fixed code for determining a card issuer and a card type of the card issuer and may use digits of a plurality of detailed codes. For example, if the real card number has a 16-digit card identification number and includes a first code and a second code as detailed codes, the virtual card number generating device 100 may equally divide 10 digits except for a 6-digit fixed code among 16 digits to generate the first code and the second code, each of which has 5 digits. Thereafter, the virtual card number generating unit 120 which will be described below may combine the first code with the second code depending on a specific rule and may combine a fixed code to a front portion to generate a card identification number of a virtual card number as shown in a card identification number of a real card number.

Further, for example, the virtual card number generating unit 120 may generate a virtual card number configured with a detailed code using digits of a card identification number and an expiration date of a card number. In other words, in a 16-digit card identification number and a 4-digit expiration date, the virtual card number generating device 100 may maintain 6 digits corresponding to an IIN of a real card number as a fixed code and may assign the remaining 14 digits to a plurality of detailed codes. The detailed code generating unit 110 may generate a detailed code corresponding to each of the assigned digits.

Further, for example, the virtual card number generating device 100 may use a card identification number, an expiration date, and a card security code of a real card number as digits to be assigned to a detailed code in a virtual card number. For example, the virtual card number generating device 100 may maintain 6 digits corresponding to an IIN of the real card number as a fixed code and may assign the remaining 10 digits of the card identification code, 4 digits of the expiration date, and 3 digits of the card security code to each detailed code.

Further, for example, the virtual card number generating device 100 may represent a detailed code and a fixed code of the virtual card number using only the card identification number. In this case, the virtual card number generating device 100 may assign different digits to a plurality of detailed codes. In other words, if the virtual card number includes a fixed code, a first code, and a second code and if the fixed code, the first code, and the second code are generated using only digits of the card identification number, the virtual card number generating device 100 may divide and assign 9 digits among digits except for 6 digits assigned to the fixed code to the first code and the second code. To apply both of cases where the card identification number has 15 digits and where the card identification number has 16 digits, a virtual card number generation function may be to assign only 9 digits of the card identification number to the first code and the second code. For example, the virtual card number generation function may be to assign 6 digits among 9 digits to the first code and assign 3 digits to the second code. As such, if a code configuring a virtual card number is represented using only the card identification number in the entire card number, the number of characters which should be input in a situation where a user should directly enter a card number may be reduced. Further, the virtual card number generating device 100 may use an expiration date and a card security code as another purpose for enhancing security.

Further, as an embodiment, the virtual card number may further include a virtual security code. For example, the virtual card number may include a plurality of detailed codes and the virtual security code. The security code of the virtual card number may be provided using digits of a card security code (e.g., a CVV or CVC) of a real card number. In other words, to include the same number of characters as a real card number used in a conventional financial transaction system, the virtual card number generating device 100 may assign digits of a card security code to the virtual security code of the virtual card number and may assign all or some of digits of a card identification number and an expiration date to a plurality of detailed codes.

The security code may be a code generated based on a specific security code generation function and may be used to verify whether the virtual card number is a normal virtual card number. The security code generation function may be to generate a security code of specific digits by using time data and an eigen value of the virtual card number generating means 10 as a function value.

An example of a process of determining whether the virtual card number is normal using the virtual security code is described hereinafter. The virtual card number verifying means 20 may receive an eigen value of the virtual card number generating device 100 (e.g., an eigen value of a chip in a smart card, an eigen value of a smartphone in which an app card is installed, or the like) when a real card number is issued, and may store the received eigen value together in a storage location of a real card number or may store the received eigen value in a separate storage space connected to the storage location of the real card number. If the virtual card number generating device 100 generates the virtual card number with which the virtual security code is combined and provides the virtual card number to the virtual card number verifying means 20, the virtual card number verifying means 20 may calculate the virtual security code by obtaining time data about a time when the virtual card number is generated based on a detailed code, extracting a specific eigen value stored in the virtual card number generating device 100, and applying the extracted eigen value together with the time data to a virtual security code generation function (e.g., a one-time password (OTP) function). The virtual card number verifying means 20 may determine whether a virtual security code (i.e., a reception virtual security code) received by the virtual card number generating device 100 is identical to a virtual security code (i.e., a generation virtual security code) calculated using a virtual security code generation function stored in the virtual card number verifying means 20. Since there is a difference between a time when the virtual card number generating device 100 generates a virtual card number and a time when the virtual card number verifying device 200 receives the virtual card number, the virtual card number verifying device 200 may calculate a virtual security code (e.g., an OTP number) within a specific time range (e.g., before a specific count from a time when the virtual card number is received) in consideration of a time delay and may verify whether there is a value identical to a reception virtual security code received from the virtual card number generating device 100. If the reception virtual security code is identical to the generation virtual security code, the virtual card number verifying means 20 may determine the virtual card number as a normal virtual card number and may provide a real card number.

For example, the virtual security code may be generated with digits corresponding to a card security number. In other words, the virtual card number generating device 100 may generate 3 or 4 digits corresponding to the card security number as the virtual security code using a virtual security code generation function. If the virtual security code is entered as the card security number when a card is used, the virtual card number verifying means 20 may perform a process of verifying the virtual security code.

Further, for another example, the virtual security code generation function may be to generate a different code of I digits (I is a natural number) for each count and apply the generated code together as a function value. In other words, the virtual security code generation function may include a random code generation function of the I digits (e.g., an OTP function of generating a code of the I digits).

Further, as an embodiment, if the virtual card number is generated by a combination according to a specific rule of the first code and the second code, each of the first code and the second code may play a role for searching for a storage location where a real card number is stored. For example, the first code may be to set a start point for searching for the storage location, and the second code may be to set a search path from the start point to the storage location depending on a specific search scheme. In other words, if a virtual card number normally generated per unit count is received from the virtual card number generating device 100, the virtual card number verifying means 20 may determine a point moved along the search path corresponding to the second code from the start point corresponding to the first code as the storage location of the real card number. A description will be given of a detailed manner of searching for the storage location based on the first code and the second code configuring the virtual card number.

As an embodiment of a manner in which the detailed code generating unit 110 generates a detailed code, the detailed code generating unit 110 may generate a new detailed code per unit count. Thus, the virtual card number generating device 100 may generate a new virtual card number per unit count. The virtual card number newly generated per unit count may fail to be duplicated and generated. In detail, the detailed code generating unit 110 may be configured such that the virtual card number newly generated per unit count is not duplicated and generated during a predetermined period of time to a specific user or the specific virtual card number generating device 100 and such that the virtual card number is not duplicated and generated between users who belong to a specific group.

As a detailed embodiment of preventing the virtual card number from being duplicated and generated, if the first code or the second code of N digits is generated with M characters, a detailed code generation function included in a virtual card number generation function may be to generate $M^N$ codes as the first code or the second code and match each code for each count from an initial time when the detailed code generation function is driven. For example, if a unit count is set to 1 second, the detailed code generation function may be to match different $M^N$ codes every second from a time when the detailed code generation function is initially driven. If a period when a specific detailed code generation function is used or a use period of the virtual card number generating device 100 (e.g., an expiration date of a smart card which generates a virtual card number) is set to a time length which is shorter than a time length (e.g., $M^N$ seconds if 1 count is 1 second) corresponding to $M^N$ counts, the same code of the first code or the second code may fail to be duplicated and generated during the use period. In other words, when a count is increased over time, if a user requests the virtual card number generating device 100 to generate a virtual card number at a specific time, the virtual card number generating device 100 may generate a code value matched to a count corresponding to the specific time as the first code or the second code.

In detail, if uppercase alphabets and numbers of 0 to 9 are used as characters which may be included in a code (e.g., if 36 characters are used) and if 6 digits are respectively assigned to the first code and the second code using digits of a card identification number and an expiration date of a real card number. The virtual card number generating device 100 may provide $36^6$ codes to the first code and the second code. In this case, the virtual card number generating device 100 may match each code per count to provide the first code and the second code changed per count.

As another detailed embodiment of preventing the virtual card number from being duplicated and generated, if a use period of the virtual card number generating device 100 elapses, a function (i.e., the first function or the second function) of generating the first code or the second code may be changed or a matching relationship between the first code and the second code may be changed to generate a virtual card number different from a previous use period. If the virtual card number is generated by combining the first code generated by the first function with the second code generated by the second function and if a first code generation function or a second code generation function is changed, the virtual card number generating device 100 may apply a virtual card number generation function, which generates a virtual card number that is differentiated according to a differentiated order of appearances of the first code and the second code in a new use period from an order of appearances of the first code and the second code in the previous use period. Further, the virtual card number generating device 100 may select the first function and the second function such that the same code as a virtual card number used in the previous use period does not appear as a virtual card number of each count within the new use period (i.e., such that a matching relationship between the first code generated according to the first function and the second code generated according to the second function is not included in matching relationships included in the previous use period in all counts of the new use period). In other words, the virtual card number generating device 100 may apply a virtual card number generation function of the new use period when a virtual card number overlapped with the previous use period is not generated by adjusting or updating a virtual card number generation function after a use period for applying every $M^N$ codes elapses.

In this case, each of the virtual card number generating means 10 and the virtual card number verifying means 20 may store a rule of updating a virtual card number generation function. In other words, each of the virtual card number generating means 10 and the virtual card number verifying means 20 may store an order or rule in which a plurality of first and second functions are applied to each use period.

Further, as another detailed embodiment of preventing the virtual card number from being duplicated and generated is described. In such another embodiment, the same virtual card number is not generated at the same time between users who belong to the same group. In order to do so, one of the first code and the second code, which are included in the virtual card number, is generated based on a value that is different for each virtual card number generation device 100 (i.e., a device identification value). Even in the same time moment, the value is different for each virtual card number generation device 100. As an embodiment, the device identification value may be a time (or a count number) which elapses from a time when the specific virtual card number generating device 100 is included in a group to which a specific detailed code generation function is applied (e.g., a time started to apply the detailed code generation function to the specific virtual card number generating device 100 after a specific time elapses from an initial time when the specific detailed code generation function is driven in the virtual card number verifying means 20) to a current time. If there are multiple virtual card number generating devices 100, and if each virtual card number generating device 100 is configured to belong to the group is not identical to each other (i.e., if the multiple virtual card number generating devices 100 do not belong to the group simultaneously), a time which elapses from a time (or count) when the virtual simultaneously generating device 100 belongs to the group to a specific time may vary for each virtual card number generating device 100. Thus, as at least any one of detailed code generation functions uses the time, which elapses from the time (or count) when the virtual card number generating device 100 belongs to the group to the specific time, as a device identification value, a virtual card number generated by each of the plurality of virtual card number generating devices 100 may vary for each time. Thus, the virtual card number generating device 100 may be distinguished by receiving the virtual card number at the virtual card number verifying means 20 rather than separately receiving data for identifying a user.

For example, if the virtual card number generating device 100 is a card (e.g., a smart card, an app card, or the like) which may change an output card number, a specific card type of a specific card issuer may be set to one group. The specific virtual card number verifying means 20 in a card issuer server may be driven for the group. If a first user requests the first virtual card number generating device 100 (i.e., the virtual card number generating device 100 of the first user) to issue a card at a time which elapses from the virtual card number verifying means 20 is driven by time A and if a second user requests the second virtual card number generating device 100 (i.e., the second virtual card number generating device 100 of the second user) to issue a card at a time which elapses from the virtual card number verifying means 20 is driven by time B (B is a value greater than A), a time length of a time which elapses from a time when a card is issued may vary always in time C (C is a value greater than B) when it is requested to generate the virtual card number from the first user and the second user. Thus, as a detailed code generation function applies a time length of a time which elapses from a time when a card is issued to each of the plurality of virtual card number generating devices 100 as a variable, the same virtual card number may fail to be generated at the same time.

Since a time length of a time which elapses from a time when the specific virtual card number generating device 100 belongs to a specific group continue increasing over time, a detailed code (e.g., a second code) generated by the specific virtual card number generating device 100 may fail to be generated as the same value and may be continuously generated as a different value.

As another detailed embodiment of preventing the virtual card number from being duplicated and generated, the first code may be set to a code value corresponding to a time (or count) which is requested to generate the virtual card number among codes matched for each count from an initial time when the first function is driven in the virtual card number verifying means 20, and the second code may be set to a code value generated by reflecting a value (i.e., a device identification value) which differently exists always at the same time for each virtual card number generating device 100, such that a duplicated virtual card number is not generated irrespective of a user in the entire period. The virtual card number may be used as a code value in which the first code and the second code are combined. Since the first code has a different code value for each count and since the second code has a different code value for each virtual card number generating device 100 at the same time, a virtual card number in which the first code and the second code are combined may be output as different code values all the virtual card number generating devices 100 and all times.

Further, as another embodiment, any one of a plurality of sorting rules of sorting M characters in an ascending order may be applied to the virtual card number generation function (or the detailed code generation function). In other words, the virtual card number generating device 100 (i.e., the virtual card number generating means 10) may apply a rule of sorting the M characters in the ascending order to a detailed code generation function included in the virtual card number generation function in various manners. For example, a sorting rule of sorting uppercase alphabets in an ascending order may be an order of A, B, C, . . . , and Z, which is a general order, or may be an order of A, C, B, . .

., and Z. As a sorting rule varies in the virtual card number generation function, an order where a code is matched in each count in turn from an initial time when the virtual card number generation function is driven may vary. The virtual card number verifying means 20 may match a code generated according to the same sorting rule to each count or may store the same sorting rule itself, included in the virtual card number generation function. Thus, as a virtual card number generation function for each group includes a different detailed code combination function or a different character sorting rule, the virtual card number verifying means 20 may have a different virtual card number generation function for each group.

Figure 5:
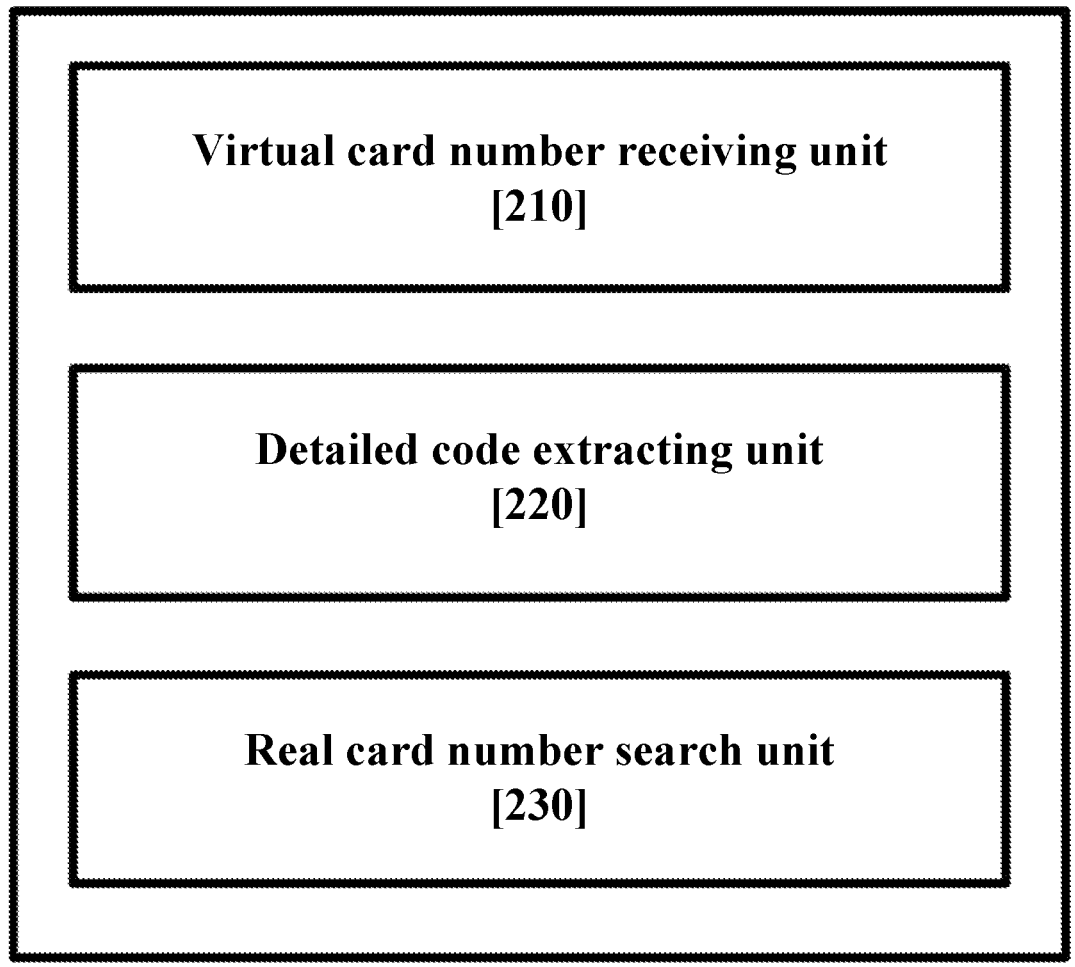
FIGS. 5 and 6 are block diagrams illustrating a configuration of a virtual card number verifying device according to embodiments of the inventive concept.

The virtual card number providing unit 130 may play a role in outputting the virtual card number to the outside to provide the virtual card number to a virtual card number verifying device 200 of FIG. 5. The virtual card number providing unit 130 may include a variety of elements which may provide the virtual card number to the outside. The virtual card number providing unit 130 may include all or some of a wireless Internet module, a short-range communication module, an integrated circuit (IC) chip 131, a magnetic field generating unit, a display 132, and the like.

The wireless Internet module may refer to a module for accessing wireless Internet and may be internally or externally mounted on a mobile terminal. Wireless local area network (LAN) (WLAN) (wireless-fidelity (Wi-Fi)), wireless broadband (Wibro), world interoperability for microwave access (WiMAX), high speed downlink packet access (HSDPA), long term evolution (LTE), LTE-advanced (LTE-A), or the like may be used as wireless Internet technology. For example, if the virtual card number generating device 100 is a mobile terminal in which an app card application which is a virtual card number generating means is installed, when a user purchases a product in a shopping application or a shopping website, the virtual card number generating device 100 may transmit a virtual card number to a payment service server (e.g., a PG server) 40 through wireless Internet communication.

The short-range communication module may refer to a module for short-range communication. Bluetooth, Bluetooth low energy (BLE), beacon, radio frequency identification (RFID), near field communication (NFC), infrared data association (IrDA), ultra-wideband (UWB), Zigbee, or the like may be used as short-range communication technology.

If the virtual card number generating device 100 corresponds to a card which transmits a virtual card number to a POS device 30 of FIG. 2, the virtual card number providing unit 130 may include the magnetic field generating unit or the IC chip 131. The magnetic field generating unit may perform a function of outputting card data in the form of a magnetic signal to transmit the card data to a card reader. The magnetic field generating unit may include one or more magnetic cells which forms a magnetic field through a current flow and outputs a card information magnetic signal. The magnetic field generating unit may be provided to be exposed to an upper surface or a lower surface of a printed circuit board (PCB) along a specific long side to be adjacent to the specific long side of the PCB of a card.

The IC chip 131 may be mounted on the PCB and may be in contact with a port of an IC-type card reader to exchange data. In other words, the IC chip 131 may transmit a virtual card number generated by the virtual card number generating unit 120 to the IC-type card reader.

The display unit 132 may include at least one of a liquid crystal display, a thin film transistor-liquid crystal display, an organic light-emitting diode, a flexible display, or an electronic paper (E-paper).

The display unit 132 may visually output a virtual card number generated by the virtual card number generating unit 120 to the outside. Thus, a user of the virtual card number generating device 100 may visually verify a virtual card number generated in real time and may directly input the visually verified virtual card number to the virtual card number verifying means 20.

For example, as shown in FIGS. 4A to 4C, the virtual card number generating device 100 is a smart card, it may include a display unit 132 which may output a virtual card number without writing a card number on its surface. Further, for example, if a virtual card number includes the same fixed code as an IIN, the virtual card number generating device 100 may write the IIN on a card surface and may have only digits of the remaining card number as a display unit. For example, the display unit 132 may be an E-paper, an OLED, or the like and may be a 7-segment display provided to each digit. Further, for example, if the virtual card number generating device 100 is a smartphone in which an app card application is installed, a display unit may be a display unit of the smartphone, on which the app card application is executed and displayed.

Further, the user may send the virtual card number displayed on the display unit 132 through various paths such as a text message. Since the user sends the virtual card number (specifically, a continuously changed and generated code) for searching for a real card number at the virtual card number verifying means 20 rather than transmitting a real card number, he or she may fail to worry about hacking of the real card number when transmitting a code through a text message or the like.

Figure 6:
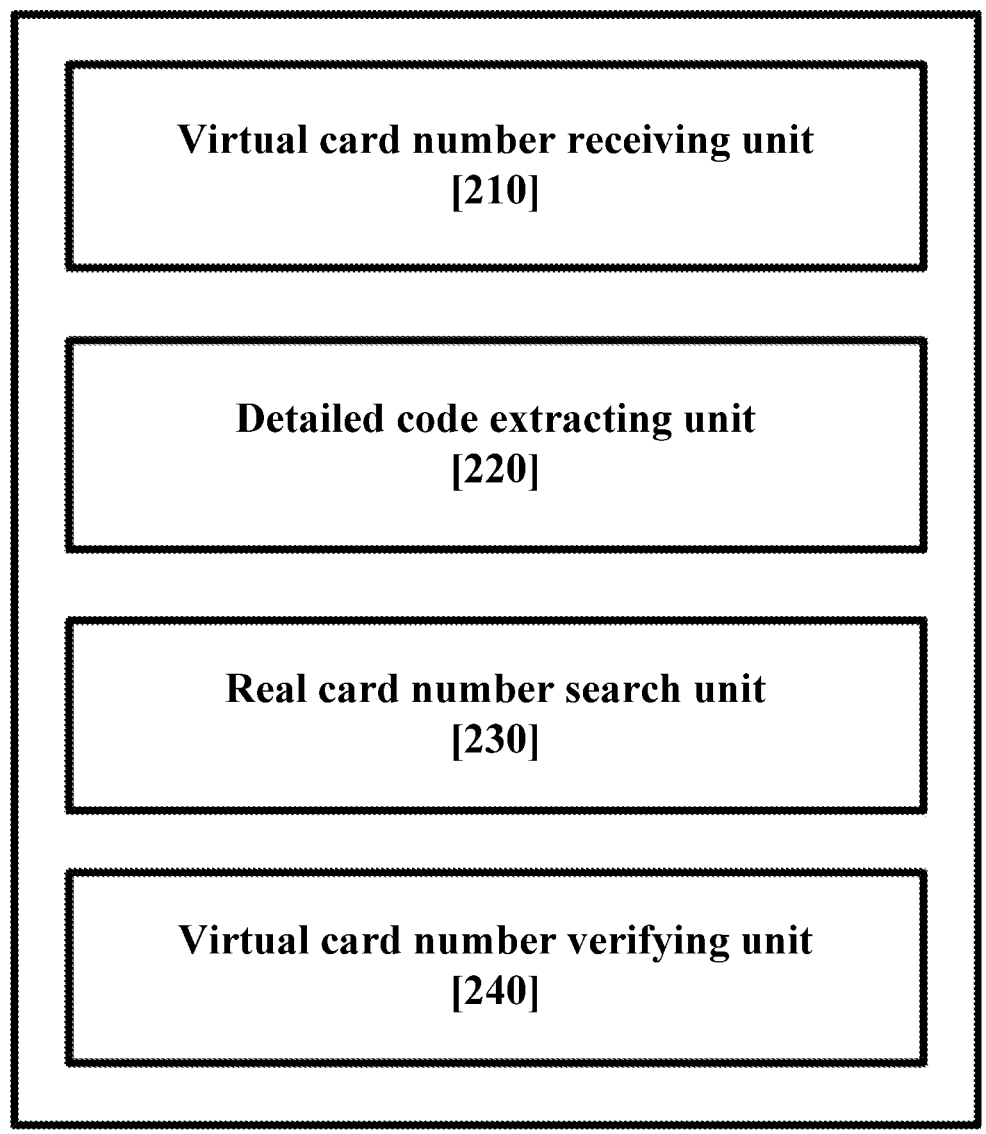

FIGS. 5 and 6 are block diagrams illustrating a configuration of a virtual card number verifying device 200 according to embodiments of the inventive concept.

Referring to FIG. 5, the virtual card number verifying device 200 according to an embodiment of the inventive concept may include a virtual card number receiving unit 210, a detailed code extracting unit 220, and a real card number search unit 230. The virtual card number verifying device 200 may be a financial institution server (e.g., a card issuer server or a bank server).

For example, the virtual card number verifying device 200 may be a card issuer server which receives a virtual card number for a specific type of a card of a specific card issuer, possessed by a specific user, searches for a real card number, and proceeds with payment. In detail, in case of card payment, the virtual card number verifying device 200 may receive a virtual card number, generated by the virtual card number generating device 100, via a POS device 30 and a PG server 40.

Further, for example, if a user wants to withdraw cash from an ATM using a smart card which is a virtual card number generating device 100 of FIG. 3, the virtual card number verifying device 200 may be a bank server. In other words, if the user inputs a virtual card number to the ATM using the smart card which is the virtual card number generating device 100 (e.g., if he or she inserts the smart card into a card insertion slot or if he or she brings the smart card into contact with an NFC reader), the bank server may receive a virtual card number from the ATM and may search for a real card number.

The virtual card number receiving unit 210 may play a role in receiving the virtual card number from the virtual card number generating device 100. As an embodiment, the virtual card number receiving unit 210 may receive the virtual card number, generated by the virtual card number generating device 100, through communication with another server (e.g., a payment service server 40 of FIG. 2).

The detailed code extracting unit 220 may extract a plurality of detailed codes included in the virtual card number. The virtual card number may be generated by combining the plurality of detailed codes depending on a specific rule. The detailed code extracting unit 220 of the virtual card number verifying device 200 may include the same detailed code combination function as the virtual card number generating device 100 of a specific group. The detailed code extracting unit 220 may extract the plurality of detailed codes from the virtual card number by applying the detailed code combination function. For example, if the virtual card number generating device 100 generates a virtual card number in which two detailed codes (i.e., a first code and a second code) are combined, the detailed code extracting unit 220 may extract the first code and the second code from a string of the virtual card number by applying the detailed code combination function.

The real card number search unit 230 may search for a storage location of a real card number based on the plurality of detailed codes. A variety of manners may be applied to the manner of searching for the storage location of the real card number based on each of the plurality of detailed codes at the real card number search unit 230. The real card number search unit 230 may include correlation between the plurality of detailed codes to search for a storage location based on the plurality of detailed codes.

If the virtual card number is configured with the first code and the second code, as an embodiment having correlation between the plurality of detailed codes, the real card number search unit 230 may determine a search start point corresponding to the first code and may search for a point moved along a search path corresponding to the second code from the search start point as a storage location of a real card number. In other words, the detailed code may include the first code for setting a start point for searching for a storage location and the second code for setting a search path from the start point to the storage location depending on a specific search scheme.

Further, as another embodiment, as a virtual card number generating means 10 of FIG. 1 (or the virtual card number generating device 100) provides a new virtual card number per unit count, the virtual card number verifying device 200 may set a search start point and a search path based on the first code and the second code changed for each count and may search for a storage location of a real card number.

Further, as another embodiment, the real card number search unit 230 may include a storage location search algorithm to search for a storage location of a real card number using the plurality of detailed codes having correlation. The storage location search algorithm may be an algorithm for searching for a storage location when each of the plurality of detailed codes included in the virtual card number is applied. For example, if including a first code for determining a start point for searching for a storage location from a virtual card number and a second code for providing a direction of the storage location from the start point, the storage location search algorithm may be an algorithm of adjusting to arrange a storage location to which a real card number is matched in a corresponding location when indicating a direction corresponding to the second code at a point corresponding to the first code. As the storage location search algorithm is used, the virtual card number verifying device 200 may search for the storage location of the real card number or a point matched to the storage location although the first code and the second code included in the virtual card number are changed. Various manners may be applied to the storage location search algorithm. A description will be given in detail of the storage location search algorithm. Herein, the storage location search algorithm is not limited to an example described below.

For example, as will be described below, referring to FIG. 8, if the storage location search algorithm is a k-gon (k is $M^N$) which performs a rolling motion along a track in which $M^N$ codes corresponding to the first code are sorted and if a vertex of the k-gon is moved to correspond to a point where the code is located on a first code track, each vertex of the k-gon may be matched to a storage location of a real card number and a point where the first code track (i.e., a first track) corresponds to the k-gon may be a start point for searching for a storage location corresponding to the first code. In this case, the real card number search unit may perform a rolling motion of the k-gon such that the vertex of the k-gon is adjacent to a point corresponding to the first code extracted by the detailed code extracting unit. Thus, as it is indicated at an angle corresponding to the second code in a location on the first track to which the k-gon is adjacent (e.g., a specific angle for dividing 180 degrees into $M^N$ portions to face the vertex of the k-gon), the real card number search unit 230 may search for the vertex of the k-gon, which is a storage location where a real card number corresponding to a virtual card number is stored.

Figure 8:
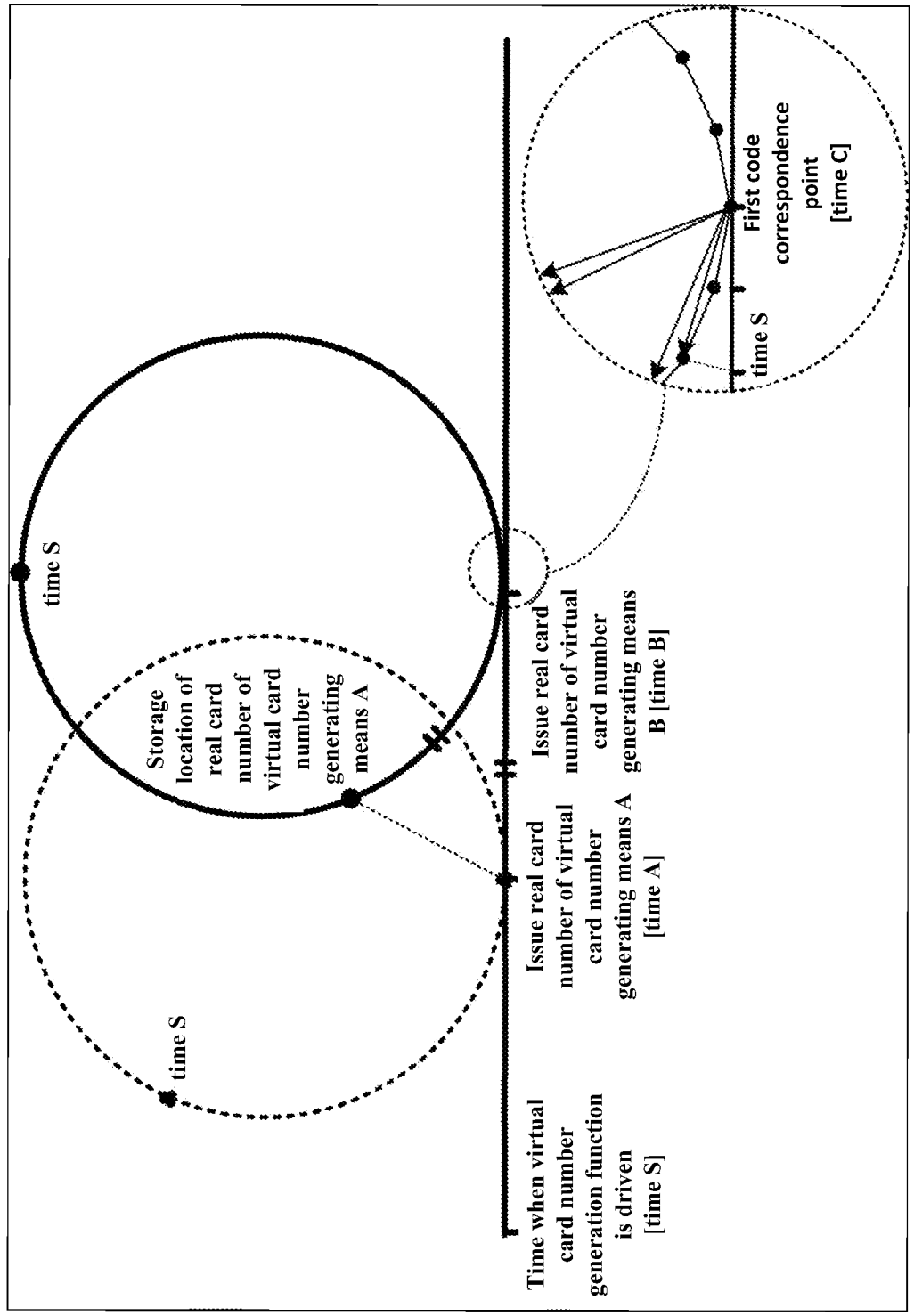
FIG. 8 is a drawing illustrating a storage location search algorithm for searching for a storage location of a real card number through rolling motion of a k-gon according to an embodiment of the inventive concept.

In detail, as shown in FIG. 8, the virtual card number verifying device 200 may perform a rolling motion of the k-gon to a point corresponding to the first code (i.e., move the k-gon such that each vertex of the k-gon is adjacent to each point on a track in turn). Thereafter, the virtual card number verifying device may indicate an angle direction corresponding to the second code and may search for a vertex corresponding to a storage location. For example, since 2 counts elapse after a real card number is issued, a virtual card number generating means B may generate a second code to which the 2 counts are applied as a function value and may provide the generated second code to a virtual card number verifying means. Since the virtual card number verifying means may match and store a second code generated by a second function for each count to an angle which faces each vertex from a point where the k-gon and a track are adjacent to each other (i.e., match and store the second code to which n counts are applied to an angle which faces an $n^{th}$ vertex which performs a rolling motion as the rolling motion is performed by the n counts of the k-gon), it may search for a vertex of the k-gon, corresponding to a storage location of a real card number, by applying an angle corresponding to the second code to a first code correspondence point.

Further, as another embodiment, as shown in FIG. 6, the virtual card number generating device 200 may further include a virtual card number verifying unit 240. The virtual card number verifying unit 240 may play a role in determining whether a virtual card number received by the virtual card number verifying device 200 is true.

Figure 7:
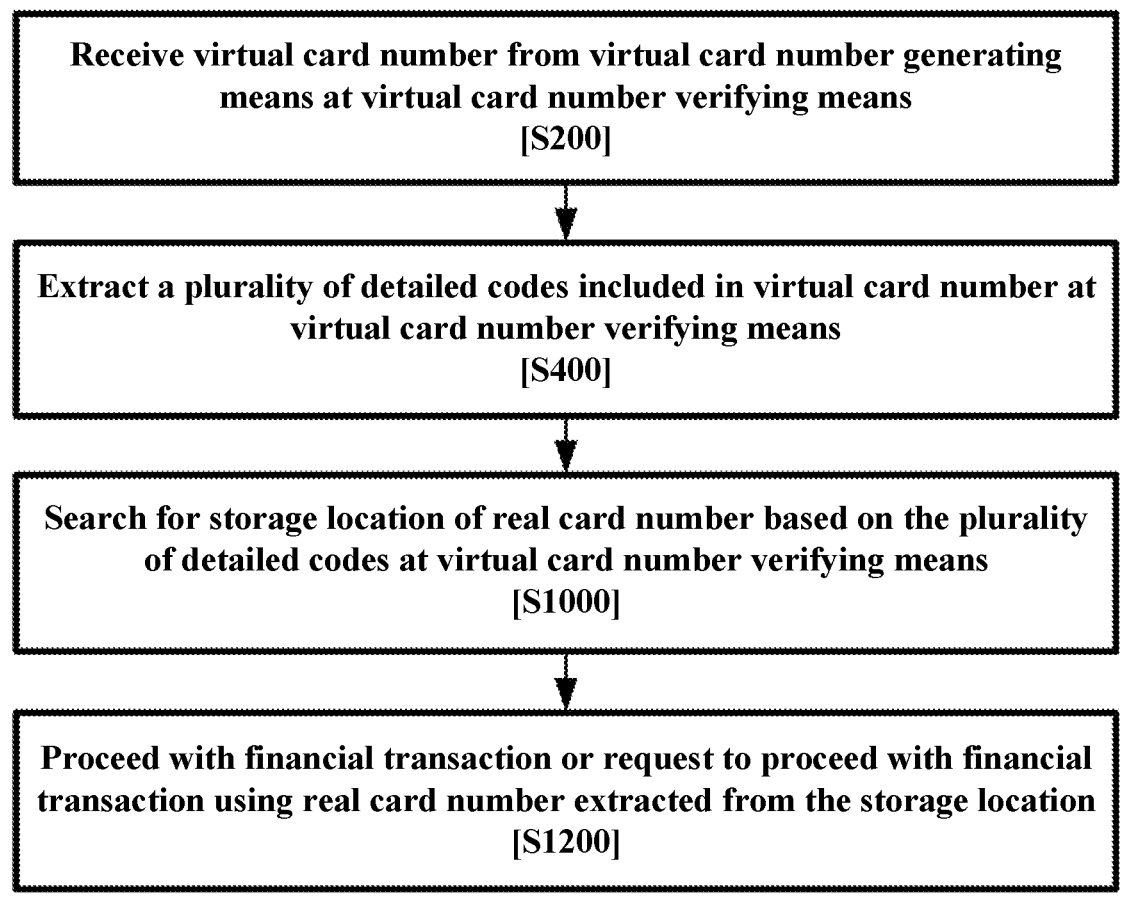
FIG. 7 is a flowchart illustrating a method for providing a financial transaction by a virtual card number according to an embodiment of the inventive concept.
Figure 9:
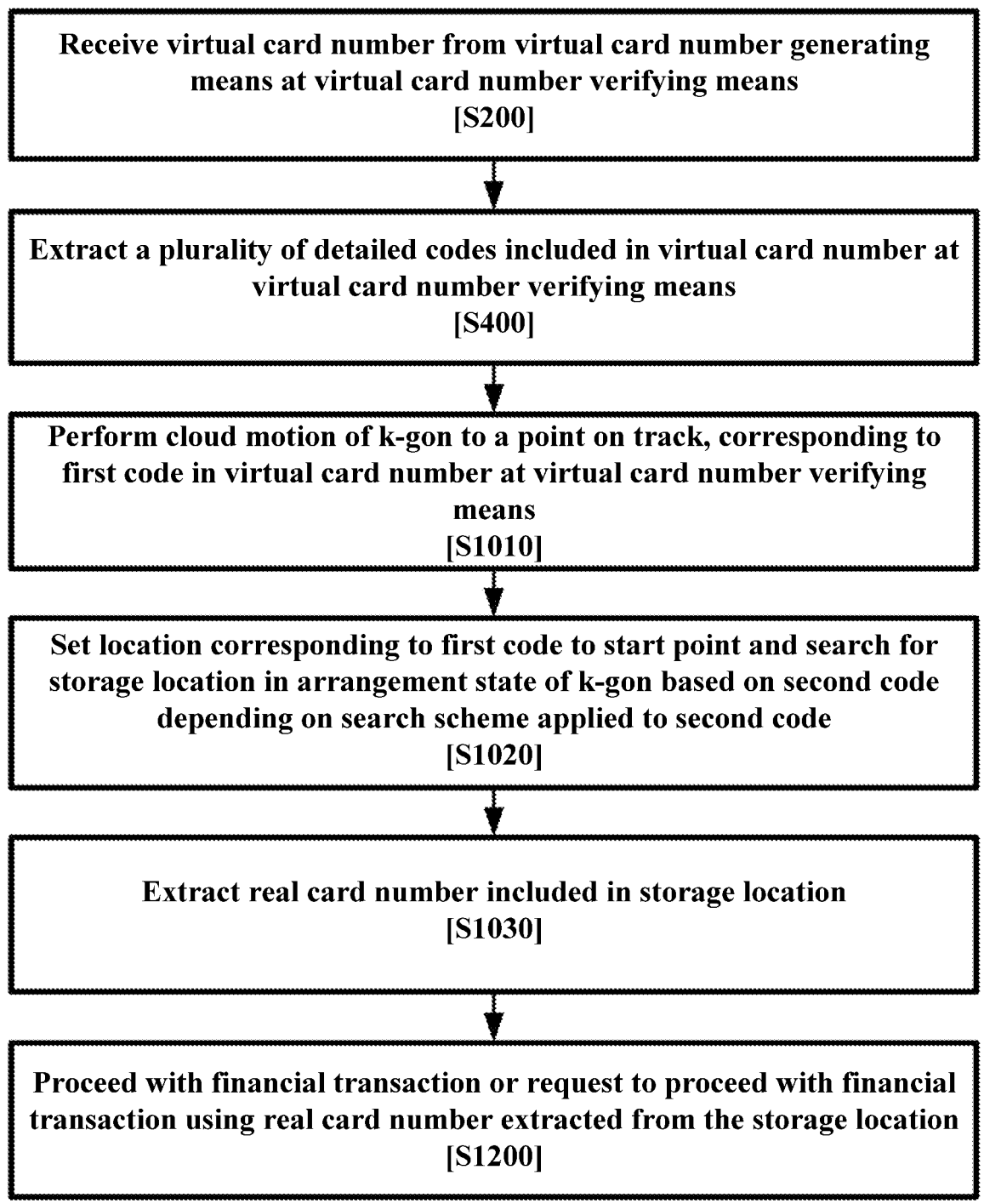
FIG. 9 is a flowchart illustrating a method for providing a financial transaction by a virtual card number, including a real card number search process according to rolling motion of a k-gon, according to an embodiment of the inventive concept.
Figure 10:
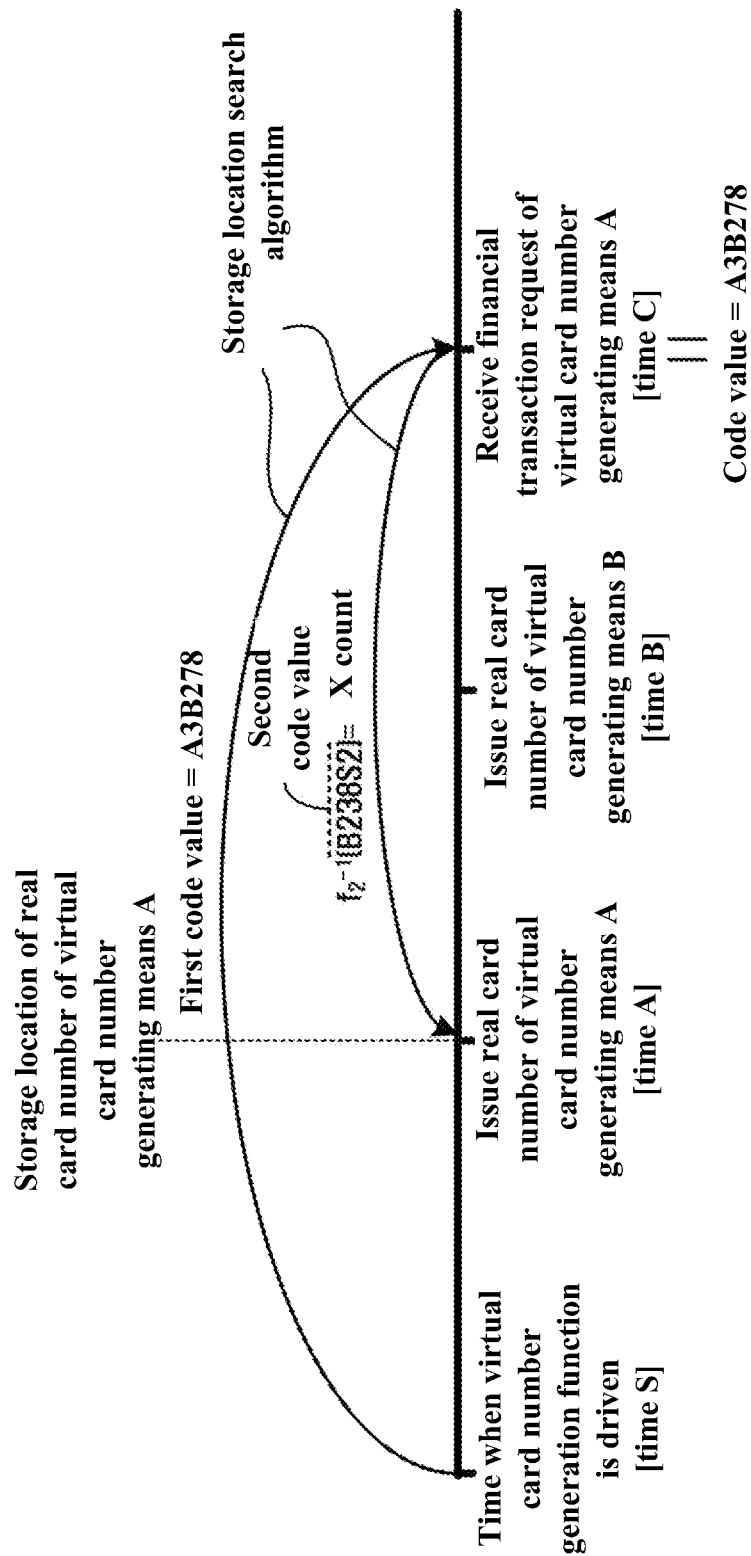
FIG. 10 is a drawing illustrating a storage location search algorithm for moving on a track based on a detailed code and searching for a storage location according to an embodiment of the inventive concept.
Figure 11:
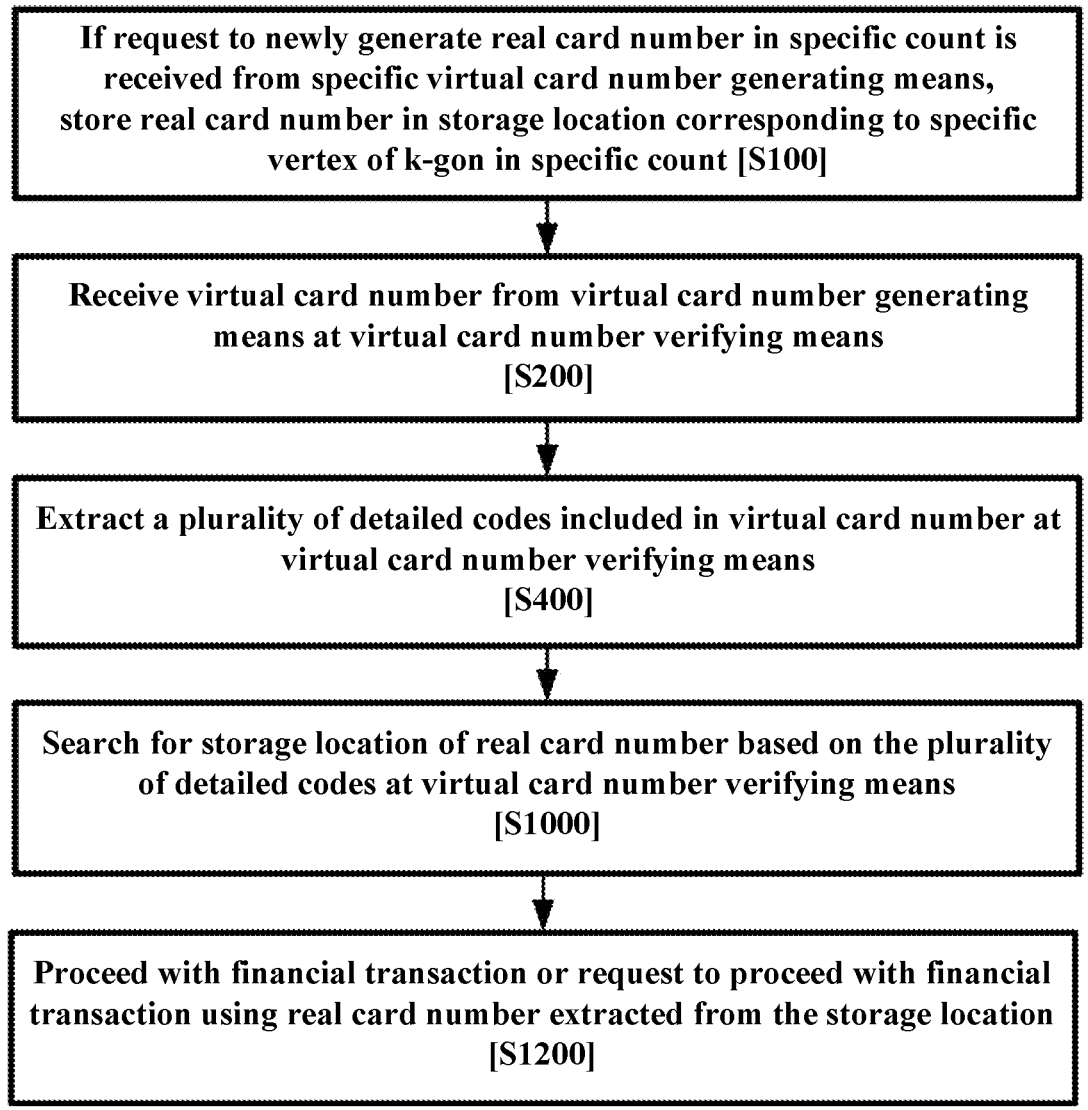
FIG. 11 is a flowchart illustrating a method for providing a financial transaction by a virtual card number, further including a process of issuing a real card number and storing the real card number in a storage location, according to an embodiment of the inventive concept.
Figure 12:
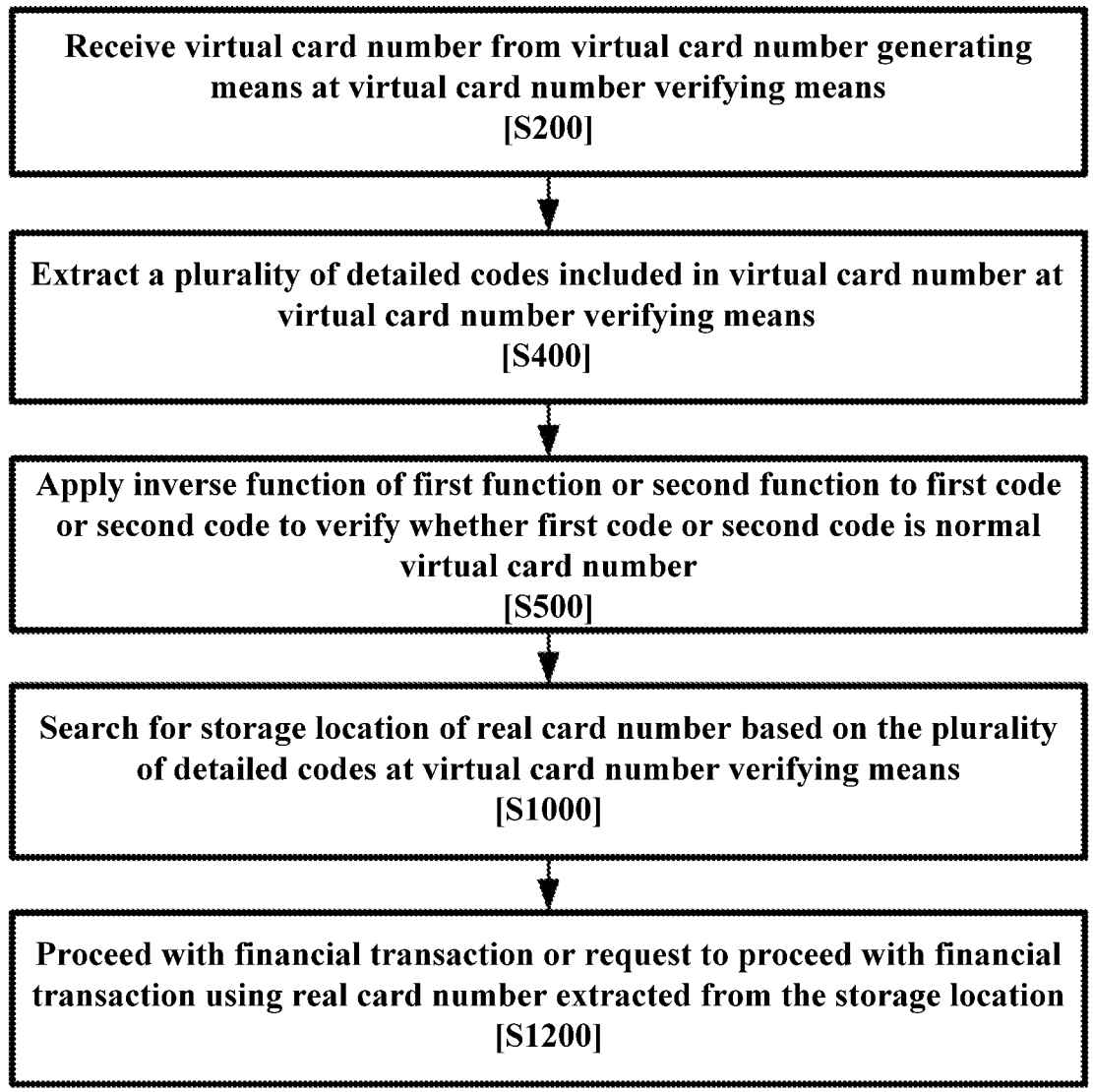
FIGS. 12 and 13 are flowcharts illustrating a method for providing a financial transaction by a virtual card number, further including a virtual card number verifying process, according to an embodiment of the inventive concept.
Figure 13:
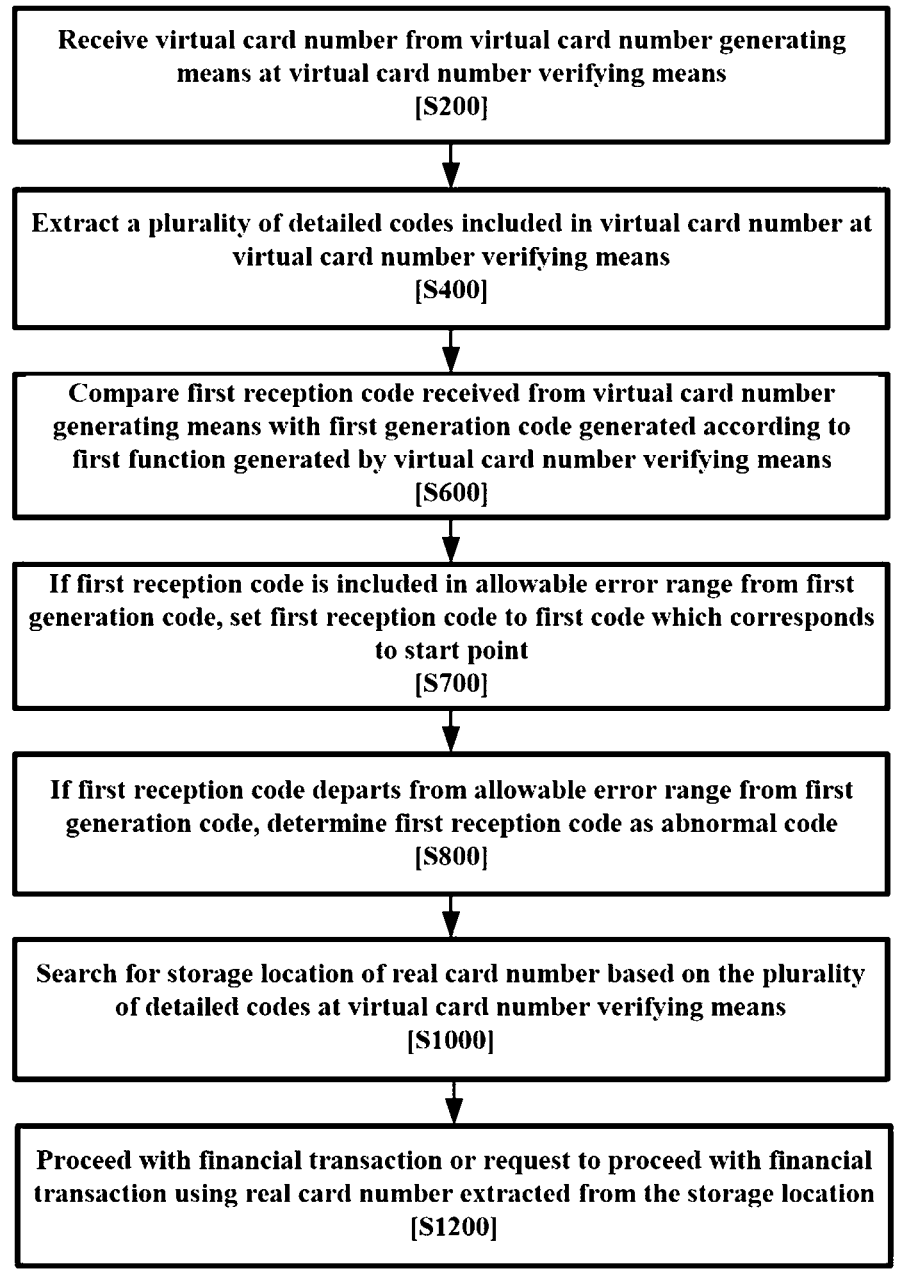
Figure 14:
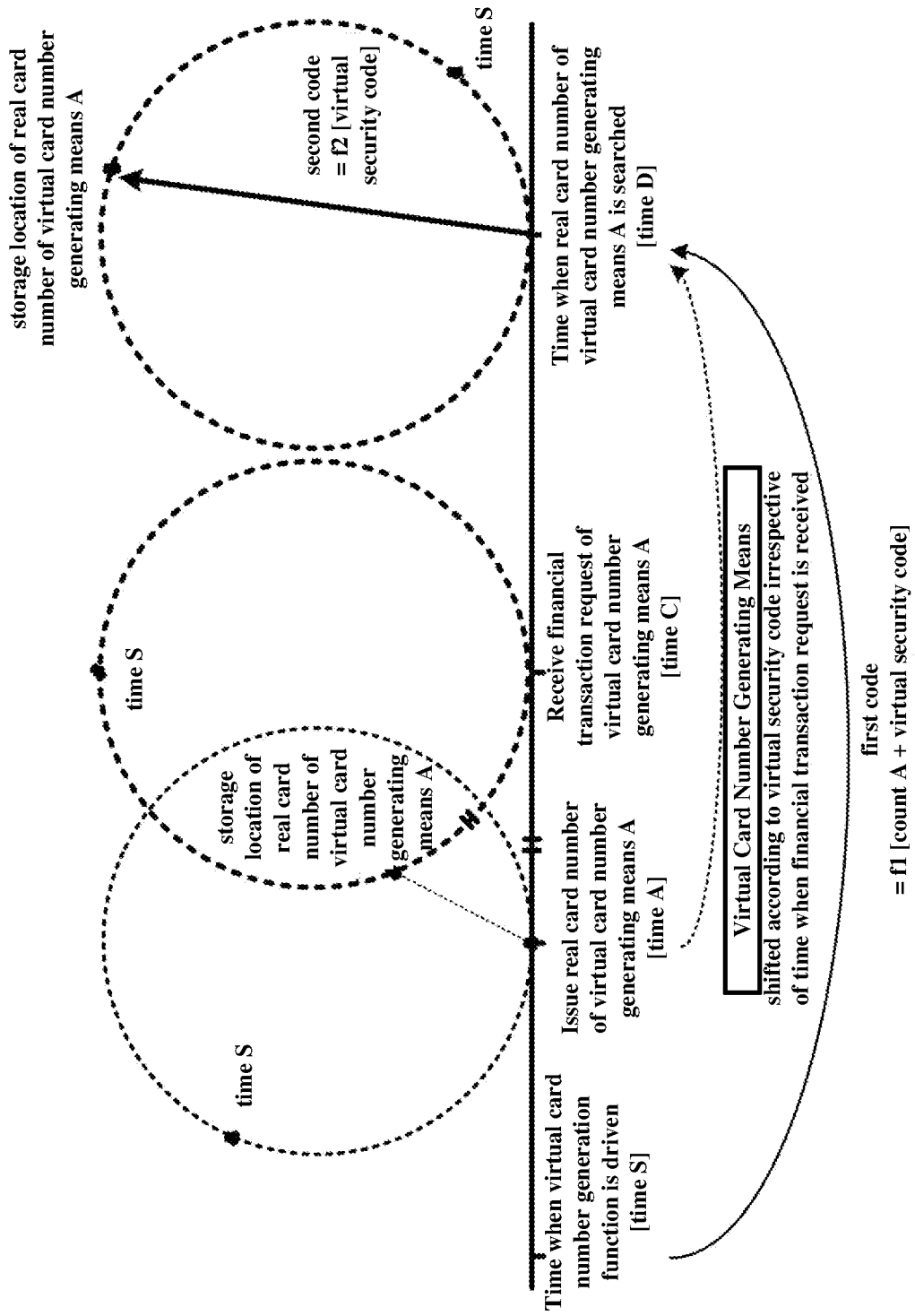
FIG. 14 is a drawing illustrating a manner of shifting a time when a real card number is searched using a virtual security code, according to an embodiment of the inventive concept.

FIG. 7 is a flowchart illustrating a method for providing a financial transaction by a virtual card number according to an embodiment of the inventive concept. FIG. 8 is a drawing illustrating a storage location search algorithm for searching for a storage location of a real card number through a rolling motion of a k-gon according to an embodiment of the inventive concept. FIG. 9 is a flowchart illustrating a method for providing a financial transaction by a virtual card number, including a real card number search process according to a rolling motion of a k-gon, according to an embodiment of the inventive concept. FIG. 10 is a drawing illustrating a storage location search algorithm for moving on a track based on a detailed code and searching for a storage location according to an embodiment of the inventive concept. FIG. 11 is a flowchart illustrating a method for providing a financial transaction by a virtual card number, further including a process of issuing a real card number and storing the real card number in a storage location, according to an embodiment of the inventive concept. FIGS. 12 and 13 are flowcharts illustrating a method for providing a financial transaction by a virtual card number, further including a virtual card number verifying process, according to an embodiment of the inventive concept. FIG. 14 is a drawing illustrating a manner of shifting a time when a real card number is searched using a virtual security code, according to an embodiment of the inventive concept. FIG. 15 is a flowchart illustrating a method for providing a financial transaction by a virtual card number, further including a financial transaction cancellation process, according to an embodiment of the inventive concept.

Referring to FIG. 7, the method for providing the financial transaction by the virtual card number according to an embodiment of the inventive concept may include receiving (S200), by a virtual card number verifying means 20 of FIG. 1, the virtual card number from a virtual card number generating means 10 of FIG. 1, extracting (S400), by the virtual card number verifying means 20, a plurality of detailed codes included in the virtual card number, searching (S1000), by the virtual card number verifying means 20, for a storage location of a real card number based on the plurality of detailed codes, and proceeding (S1200), by the virtual card number verifying means 20, with the financial transaction or requesting, by the virtual card number verifying means 20 to proceed with the financial transaction using the real card number extracted from the storage location. Hereinafter, a description will be given in detail of each operation. Herein, a detailed description of the detailed contents in a process of describing a virtual card number generating device 100 of FIG. 3 and a virtual card number verifying device 200 of FIG. 5 or 6 will be omitted.

In operation S200, the virtual card number verifying means 20 may receive the virtual card number from the virtual card number generating means 10. The virtual card number may be generated by the virtual card number generating device 100 (or the virtual card number generating means 10) and may be provided to the virtual card number verifying means 20.

The virtual card number generated by the virtual card number generating means 10 may be configured with the plurality of detailed codes. As an embodiment, the virtual card number may be generated by a combination of a first code and a second code. Each of the first code and the second code may be used to search for a location of a real card number at the virtual card number verifying means 20. For example, the first code may be a code for setting a start point for searching for a storage location of a real card number, and the second code may be a code for setting a search path from the start point to the storage location depending on a specific search scheme.

The search scheme may be determined by a storage location search algorithm. A detailed description for determining the search scheme will be given in operation S1000 described below.

Further, as another embodiment, if the first code or the second code of N digits is generated with M characters, a virtual card number generation function may include a first function or a second function for providing different $M^N$ codes as the first code or the second code sequentially changed per unit count. In other words, the first function or the second function may be a function of generating the $M^N$ codes not to be duplicated as a count is increased and may be to generate a specific one of the $M^N$ codes as the first code or the second code in a count corresponding to a specific time. Thus, the virtual card number generating means 10 may fail to duplicate and generate the same first or second code within $M^N$ counts (i.e., a time length corresponding to the $M^N$ counts) and may generate a new detailed code (i.e., the first code or the second code) per unit count to generate a new virtual card number per unit count.

In detail, if $M^N$ codes are used as the first code or the second code as the first code or the second code of the N digits is generated using the M characters, the virtual card number generation function may be to match each code for each count from an initial time when a detailed code generation function is driven. For example, if a unit count is set to 1 second, the virtual card number generation function may be to match different $M^N$ codes every second from a time when the detailed code generation function is initially driven. If a period when a specific detailed code generation function is used or a use period of the virtual card number generating device 100 (e.g., an expiration date of a smart card which generates a virtual card number) is set to a time length which is shorter than a time length (e.g., $M^N$ seconds if 1 count is 1 second) corresponding to $M^N$ counts, the same code of the first code or the second code may fail to be duplicated and generated during the use period. In other words, when a count is increased over time, if a user requests the virtual card number generating means 10 to generate a virtual card number at a specific time, the virtual card number generating device 100 may generate a code value matched to a count corresponding to the specific time as the first code or the second code.

Further, as another embodiment, any one of the first code or the second code included in the virtual card number may be generated by reflecting a value (i.e., a device identification value) which differently exists always at the same time at each of the plurality of virtual card number generation devices 100, such that the same virtual card number is not generated at the same time in the same group (e.g., the same card type group of the same card issuer). In other words, if it is requested to issue a virtual card number at the plurality of virtual card number generating means 10 which have the same card type at a specific time, each of the plurality of virtual card number generating means 10 may generate a different first or second code by reflecting a value differently assigned to each of the plurality of virtual card number generating means 10 at each time to generate a different virtual card number.

For example, if the virtual card number includes a fixed code corresponding to an issuer identification code, the virtual card number verifying device 200 (e.g., a card issuer server) may assign a virtual card number generation function for each card type of each card issuer distinguished by an IIN. Thus, since a different virtual card number is generated between different card issuers/card types by the fixed code, the virtual card number generating means 10 should generate a detailed code such that the same card number is not generated in a specific card type group of the same card issuer. For this purpose, each of the plurality of virtual card number generating means 10 may generate a different detailed code by reflecting a value differently assigned to each of the plurality of virtual card number generating means 10 at each time to generate a different virtual card number.

For example, the device identification value may be a time (or a count number) which elapses from a start time when the specific virtual card number generating device 100 is included in a group to which a specific detailed code generation function is applied (e.g., a time started to apply the detailed code generation function to the specific virtual card number generating device 100 after a specific time elapses from an initial time when the specific detailed code generation function is driven in the virtual card number verifying means 20) to a current time. For example, as a real card number is issued as a card type of a specific card issuer according to a request of a specific user, the device identification value may be used as a time which elapses from a count in which the real card number belongs to a card type group. For example, if the virtual card number is generated by a combination of the first code and the second code, the virtual card number generation function may generate the second code based on a unit count which elapses from a time when a real card number is newly generated.

If a different code is generated although it is requested to simultaneously issue a virtual card number from the plurality of virtual card number generating means 10, a problem according to occurrence of a duplicated code may be solved. If counts for setting the virtual card number generating means 10 to belong to a card type group are identical to each other (e.g., if it is impossible to register a real card number for the virtual card number generating means 10 in the card type group at the same time), a time which elapses from a time (or count) when the virtual card number generating means 10 belongs to a group to a specific time may vary for each virtual card number generating device 100. For example, if a request to issue a card of a specific card type of a specific card issuer is received at the same time, the virtual card number verifying means 20 may assign an order to the request received at the same time depending on a predetermined condition to process the request as a request received in another count. In other words, the virtual card number verifying means 20 may match a request to issue a card, received at the same time, to a different count such that one difference of at least unit count occurs. Thus, the number of counts which elapse from a time when a real card number for each of the plurality of virtual card number generating means 10 is issued to the same specific time may vary always.

Thus, as at least any one of detailed code generation functions uses the time, which elapses from a time (or count) when the virtual card number generating device 100 belongs to a specific card type group to a specific time, as a device identification value, a virtual card number generated by each of the plurality of virtual card number generating devices 100 varies always for each time. Thus, the virtual card number generating means 10 may be distinguished by receiving the virtual card number at the virtual card number verifying means 20 rather than separately receiving data for identifying a user.

Further, since a time length of a time which elapses a time when the specific virtual card number generating device 100 belongs to a specific group continues increasing over time, a detailed code (e.g., the second code) generated by the specific virtual card number generating device 100 may be continuously generated as a different value without being generated as the same value.

Further, as another embodiment, the first code may be set to a code value corresponding to a time (or count) which is requested to generate the virtual card number among codes matched for each count from an initial time when a first function is driven, and the second code may be set to a code value generated by reflecting a value (i.e., a device identification value) which differently exists always at the same time for each virtual card number generating device 100, such that a duplicated virtual card number is not generated irrespective of a user in the entire period. The virtual card number may be used as a code value in which the first code and the second code are combined. Since the first code has a different code value for each count and since the second code has a different code value for each virtual card number generating device 100 at the same time, the virtual card number in which the first code and the second code are combined may be output as different code values irrespective of the virtual card number generating devices 100 and a time.

Further, as another embodiment, the virtual card number generation function may include a detailed code combination function corresponding to a rule of sorting a plurality of detailed codes. In other words, the virtual card number generation function may have a specific rule of sorting or arranging characters included in the plurality of detailed codes. Thus, in case of the virtual card number generating means 10 and the virtual card number verifying means 20 which include the same virtual card number generation function, the virtual card number generating means 10 may sort characters included in the plurality of detailed codes depending on the detailed code combination function and the virtual card number verifying means 20 may separate a separate detailed code from a virtual card number using the same detailed code combination function.

Further, as another embodiment, any one of a plurality of sorting rules of sorting M characters in an ascending order may be applied to the virtual card number generation function. In other words, various sorting rules of sorting the M characters in the ascending order may be applied to the virtual card number generation function. The virtual card number generation function may be classified as a different virtual card number generation function according to the applied sorting rule.

The virtual card number verifying means 20 may receive the virtual card number generated by the virtual card number generating means 10 in various manners. In other words, the above-mentioned various manners of providing the virtual card number at the virtual card number generating device 100 may be applied to the virtual card number verifying means 20.

For example, if a card issuer server includes the virtual card number verifying means 20, in operation 200, the virtual card number verifying means 20 may receive the virtual card number classified as corresponding to a specific card issuer based on the fixed code from a payment service server 40 of FIG. 2. In this case, the payment service server 40 may receive the virtual card number from a payment program driven on a financial transaction terminal 30 of FIG. 2 or a computer.

In operation S400, the virtual card number verifying means 20 may extract the plurality of detailed codes included in the virtual card number. As the virtual card number verifying means 20 includes a virtual card number generation function included in the virtual card number generating means 10, it may extract the plurality of detailed codes by applying a rule (i.e., a detailed code combination function) which combines the plurality of detailed codes in the same manner. In other words, the detailed code combination function may correspond to a rule of sorting the plurality of detailed codes and may be included in a virtual card number generation function.

Further, as another embodiment, if the virtual card number includes a fixed code for determining a group which includes the virtual card number generating means 10, operation S400 may include extracting the fixed code from the virtual card number, determining a card type group of the virtual card number generating means 10 based on the fixed code, and determining the virtual card number generation function or the storage location search algorithm for the group. In other words, if a virtual card number generation function or a storage location search algorithm is applied in a different way for each group, the virtual card number verifying means 20 may distinguish a group based on the fixed code in the virtual card number.

Further, the process of determining the virtual card number generation function using the fixed code may be performed before the process of extracting the plurality of detailed codes. Since a detailed code combination function included in the virtual card number generation function is determined after the virtual card number generation function is determined by the fixed code, the plurality of detailed codes may be extracted.

For this purpose, the fixed code may be combined to a fixed location in the virtual card number (e.g., a specific number of foremost digits of the virtual card number) to easily separate the fixed code without a separate function.

In operation S1000, the virtual card number verifying means 20 may search for a storage location of a real card number based on the plurality of detailed codes. The plurality of detailed codes may have correction therebetween. The virtual card number verifying means 20 may search for the storage location of the real card number based on the correlation between the plurality of detailed codes.

Further, as an embodiment, a code generated per unit count in the plurality of detailed codes in the virtual card number may be changed (e.g., if the virtual card number is configured with two detailed codes, a first code and a second code may be changed per unit count). The virtual card number verifying means 20 may adjust a point matched to the storage location of the real card number as a location matched with the changed first and second codes per unit count to search for the storage location of the real card number although the virtual card number is changed per unit count.

As an embodiment about the correlation between the detailed codes configuring the virtual card number, if the virtual card number is configured by a combination of the first code and the second code, the virtual card number verifying means 20 may search for a storage location by setting the first code to a search start point (i.e., a point started to search for the storage location of the real card number) and applying the second code to a path moved from the search start point to the storage location. In other words, if a virtual card number normally generated per unit count is received, the virtual card number verifying means 20 may determine a search point moved along the search path corresponding to the second code from a start point corresponding to the first code as the storage location of the real card number or a point matched to the storage location (e.g., a storage space matched to a search point in a separate server).

As an embodiment, if the second code includes all of information about a path from a search start point corresponding to the first code to a storage location, the virtual card number verifying means 20 may search for the storage location of the real card number or the point matched to the storage location along a search path corresponding to the second code from the search start point corresponding to the first code.

As another embodiment, the virtual card number verifying means 20 may include a storage location search algorithm of adjusting the storage location of the real card number to be matched with the virtual card number per unit count. In other words, the virtual card number verifying means 20 may include the storage location search algorithm of adjusting a search path to a point matched to the storage location of the real card number per unit count. If the first code and the second code are changed per unit count, the virtual card number verifying means 20 may adjust the storage location search algorithm to be matched with the changed first and second codes. The storage location search algorithm may be implemented in various forms.

As an embodiment, as shown in FIG. 9, a rolling motion of a k-gon may be performed in the storage location search algorithm such that a vertex of the k-gon corresponds to a point where each code is located on a track where k (k is $M^N$) codes are sorted. In this case, operation S1000 may include performing (S1010), by the virtual card number verifying means 20, the rolling motion of the k-gon to a point on a track, corresponding to a first code in the virtual card number received from the virtual card number generating means 10, setting (S1020) a location corresponding to the first code to a start point and searching for a storage location in an arrangement state of the k-gon or a point to which the storage location is matched, based on a second code depending on a search scheme applied to the second code, and extracting (S1030) the real card number included in the storage location.

As shown in FIG. 8, in operation S1010, the virtual card number verifying means 20 may perform the rolling motion of the k-gon to the point on the track, corresponding to the first code in the virtual card number received from the virtual card number generating means 10. The storage location search algorithm may be the k-gon (k is $M^N$) which performs a rolling motion along a track where $M^N$ codes corresponding to the first code are sorted, and a vertex of the k-gon may move to correspond to a point where a code is located on a first code track. In this case, the virtual card number verifying means 20 may perform the rolling motion of the k-gon such that a vertex of the k-gon is adjacent to the point corresponding to the first code.

As shown in FIG. 8, in operation S1020, the virtual card number verifying means 20 may set the location corresponding to the first code to the start point and may search for a storage location in an arrangement state of the k-gon or a point matched to the storage location (i.e., a specific vertex of the k-gon) based on the second code depending on a search scheme applied to the second code. The storage location may be matched to each vertex of the k-gon. A point where a first code track (i.e., a first track) and the k-gon correspond to each other may be a start point for searching for a storage location corresponding to the first code. The virtual card number verifying means 20 may search for a matching point of a storage location based on the second code from the search start point.

Various manners may be applied to the manner of searching for the storage location from the k-gon based on the second code. For example, as it is indicated at an angle corresponding to the second code in a location on the first track to which the k-gon is adjacent (e.g., a specific angle for dividing 180 degrees into $M^N$ portions to face a vertex of the k-gon), the virtual card number verifying means 20 may search for the vertex of the k-gon, which is a storage location where the real card number corresponding to the virtual card number is stored.

Further, as another example, in a state where the k-gon is adjacent to a point corresponding to the first code on the first track, the virtual card number verifying means 20 may divide the entire central angle (i.e., 360 degrees) into $M^N$ angles with respect to the center of the k-gon and a contact point on the first track and may match each angle to $M^N$ second codes. In this case, a direction of a line of moving a specific number of unit angles (i.e., 360 degrees/$M^N$) from a line of connecting the center of the k-gon with the contact point on the first track may be a specific vertex of the k-gon. Thus, if the second code corresponding to a specific angle is received, the virtual card number verifying means 20 may search for a vertex located in an angle direction.

Further, as another example, a specific digit of the second code may be used to determine an angle calculation direction. In other words, if the second code is generated using N (N is a natural number) characters, an angle measurement direction may be determined as one digit. For example, the virtual card number verifying means 20 may divide the entire central angle (i.e., 360 degrees) with respect to the center of the k-gon and the contact point on the first track. If the second code is matched to each code, the virtual card number verifying means 20 may determine whether an angle is an angle measured in a left direction or a right direction from the line of connecting the center of the k-gon with the contact point on the first track as a value of one digit.

For example, the storage location search algorithm may assign two different second codes to one of vertices on the k-gon in the angle measurement direction. In other words, when reaching one vertex at an internal angle and at an external angle, a different second code may be matched to one vertex and a different real card number may be connected to the one vertex. For another example, if the second code is generated using N (N is a natural number) characters, the storage location search algorithm may match the second code to half the entire angle (e.g., 360 degrees if it is divided with respect to a central angle) using N−1 characters and may determine an angle application direction for reaching each vertex using one digit.

The manner of searching for the storage location from the k-gon based on the second code is not limited thereto. Various manners, such as a manner of searching for a point where a point on the k-gon, corresponding to the second code, and a contact point on the first track are divided at a specific rate as a storage location, may be applied.

In operation S1030, the virtual card number verifying means 20 may extract the real card number included in the storage location. In other words, the virtual card number verifying means 20 may search for a storage location corresponding to a vertex of the k-gon and may extract the real card number in the storage location.

Further, as another embodiment, the storage location search algorithm may be to move on a track based on a plurality of detailed codes configuring the virtual card number and move to a point matched to the storage location of the real card number. For example, the point matched to the storage location of the real card number may be a point on a track corresponding to a count (or time) when the real card number is issued to the virtual card number generating means 10.

In detail, if the virtual card number includes a first code generated based on a time which elapses from a time when the virtual card number generation function is driven and a second code generated based on a time which elapses from a time when the real card number is issued to a specific virtual card number generating means 10, as shown in FIG. 10, the virtual card number verifying means 20 may set a count on a track, to which a code value corresponding to the first code is matched, to a search start point and may return along a track from the search start point by a count calculated as an inverse function of a second function is applied to the second code to search for a point on a track of a time when the real card number is issued to the virtual card number generating means 10 (i.e., the point matched to the storage location of the real card number). In operation S1200, the virtual card number verifying means 20 may proceed with a financial transaction or may request to proceed with the financial transaction using the real card number extracted from the storage location.

Further, as shown in FIG. 11, as another embodiment, the method for providing the financial transaction by the virtual card number according to an embodiment of the inventive concept may further include, if a request to newly generate a real card number in a specific count is received from the specific virtual card number generating means 10, storing (S100) the real card number in a storage location corresponding to a specific vertex of a k-gon in the specific count. The specific vertex may be a point where a track and the k-gon are met in the specific count. When a specific time (or count) elapses after the virtual card number verifying means 20 drives a virtual card number generation function and a storage location search algorithm, as a request to issue a new real card number for the specific virtual card number generating means 10 is received, the virtual card number verifying means 20 may store the newly generated real card number in a storage location matched to a vertex of the k-gon which is adjacent to a first track. In detail, the rolling motion of the k-gon may be performed to move a location where the k-gon and a track are adjacent to each other by one code for each count as the virtual card number generation function and the storage location search algorithm are driven at the virtual card number verifying means 20. If a request to issue a new real card number in a specific count is received, a vertex which is adjacent to a track in the specific count may be determined as a point on the k-gon, in which the real card number is stored.

For example, as shown in FIG. 8, as a real card number for a virtual card number generating means A is issued at time A, the virtual card number verifying means 20 may store the real card number of the virtual card number generating means A in a vertex of the k-gon adjacent to a track at time A. Thereafter, as a count elapses, the rolling motion of the k-gon may be performed along the track. A storage location where the real card number of the virtual card number generating means A is stored may rotate by rotation of the k-gon.

In other words, after the real card number is stored in a vertex of the k-gon adjacent to the track, the k-gon may rotate in accordance with elapsing of n counts and a point where the real card number is stored may rotate by the number of the n counters which elapse. Thus, if a second code is calculated by reflecting the number of unit counts which elapse from a count (i.e., time) where a real card number is issued, the virtual card number verifying means 20 may calculate a point on the k-gon, where the real card number is stored, at a time when a virtual card number is generated, through the second code.

In detail, if the first code has a code value corresponding to the number of counts which elapse from an initial time when a specific virtual card number generation function and a specific storage location search algorithm are driven in the virtual card number verifying means 20 and if the second code has a code value corresponding to the number of counts which elapse after a real card number is issued to the specific virtual card number generating means 10, the virtual card number verifying means 20 may determine a time (i.e., time C) requested to generate a virtual card number at the virtual card number generating means 10 through the first code and may determine a vertex on the k-gon, where a real card number is stored in an arrangement state of the k-gon of the time through the second code. In other words, the first code may be used to determine a point on a track to be in the arrangement state of the k-gon for searching for a specific vertex of the k-gon, and the second code may be used to search for a vertex on the k-gon, which is matched to a storage location of a real card number after the k-gon is arranged at a point on a track corresponding to the first code. Therefore, although there is a delay time when a virtual card number is generated and provided to the virtual card number verifying means 20 at the virtual card number generating means 10, the virtual card number verifying means 20 may accurately search for the real card number corresponding to the virtual card number.

Further, as another embodiment, as shown in FIG. 10, if a storage location search algorithm moved on one track based on the first code and the second code is used, as a pointer started from a track start point moves a division unit on a track whenever a unit count elapses from a time when a virtual card number generation function is driven, the virtual card number verifying means 20 may determine a point on the track, located at a time (A time) when the real card number is issued as a point matched to a storage location of the real card number.

Further, as another embodiment, as shown in FIG. 12, the method for providing the financial transaction by the virtual card number according to an embodiment of the inventive concept may further include applying (S500) an inverse function of the first function or the second function to the first code or the second code to verify whether the first code or the second code corresponds to a normally generated virtual card number. For example, if the first code has a code value corresponding to the number of counts which elapse from an initial time when a specific virtual card number generation function and a specific storage location search algorithm are driven in the virtual card number verifying means 20 and if the second code has a code value corresponding to the number of counts which elapse after a real card number is issued to the specific virtual card number generating means 10, the virtual card number verifying means 20 may store a time Ts together, which elapses until the real card number is issued after the virtual card number generation function is driven, when the real card number is stored in a storage location. The virtual card number verifying means 20 may apply the inverse function of the first function to the first code in a virtual card number to calculate an elapsed time T1 until the virtual card number is generated from a time when the virtual card number generation function is driven and may apply the inverse function of the second function to the second code in the virtual card number to calculate an elapsed time T2 until the virtual card number is generated from a time when the real card number is issued. Thereafter, the virtual card number verifying means 20 may determine whether a difference between the elapsed time T and the elapsed time T2 corresponds to the time Ts to verify the virtual card number.

Further, as another embodiment, as shown in FIG. 13, the method for providing the financial transaction by the virtual card number according to an embodiment of the inventive concept may further include comparing (S600) a first reception code received from the virtual card number generating means 10 with a first generation code generated according to a first function generated at the virtual card number verifying means 20, if the first reception code is included in an allowable error range from the first generation code, setting (S700) the first reception code to a first code which corresponds to a start point, if the first reception code departs from the allowable error range from the first generation code, determining (S800) the first reception code as an abnormal code. The same unit count may elapse over time in the virtual card number generating means 10 and the virtual card number verifying means 20. However, since there may be an error between timers included in the virtual card number generating means 10 and the virtual card number verifying means 20, there may be the different number of counts which elapse at the same time. Thus, there may be a need for a process of solving the error by the time and determining an abnormal code which is not a normal virtual card number. For this purpose, in operation S600, the virtual card number verifying means 20 may compare the first generation code which is a first code generated in a specific count by the first function in the virtual card number verifying means 20 with the first reception code which is a first code in a virtual card number received from the virtual card number generating means 10. In operation S700, if the different number of counts between the first generation code and the first reception code is within the allowable error range, the virtual card number verifying means 20 may determine the first reception code as a normal code and may perform a real card number search process with respect to the first reception code. If the different number of the counts between the first generation code and the first reception code departs from the allowable error range, in operation S800, the virtual card number verifying means 20 may determine the first reception code as an abnormal code.

Further, as another embodiment, the method for providing the financial transaction by the virtual card number may further include, if the virtual card number further includes a virtual security code of specific digits, determining whether a reception virtual security code received from the virtual card number generating means 10 at the virtual card number verifying means 20 is identical to a generation virtual security code generated in the virtual card number verifying means 20 to verify the virtual card number. The virtual security code may be generated to correspond to digits of the card security code and may be displayed on a card security code digit of the real card number.

As an embodiment, a virtual security code may be generated based on an eigen value and a card security code (e.g., a CVC/CVV number) in a virtual card number generating device 100. The eigen value may be a device eigen value separately assigned for each virtual card number generating device 100. Since the eigen value and the card security code are assigned for each virtual card number generating device 100, a person who newly receives the virtual card number generating device 100 may fail to verify the eigen value and the card security code assigned to the separate virtual card number generating device 100 to hack the virtual card number generating device 100 for a malicious purpose. Thus, the virtual card number verifying means 20 may receive a virtual security code generated based on the eigen value and the card security code by the virtual card number generating means 10 and may verify the virtual card number.

Further, as another embodiment, the virtual card number generating means 10 may generate a virtual security code by reflecting a time value. In other words, the virtual card number generating means 10 may generate the virtual security code using a one time password (OTP) scheme (a user authentication scheme of using an OTP randomly generated rather than a fixed password). The virtual card number verifying means 20 may receive an OTP number corresponding to the virtual security code from the virtual card number generating means 10 and may compare the received OTP number with an OTP calculated in a count in a specific range from a count in which the OTP number is received from the virtual card number generating means 10 to verify the virtual card number generating means 10. In other words, the virtual card number verifying means 20 may store a card security code (e.g., a CVC/CVV) in a storage location of a real card number together with an eigen value. The virtual card number verifying means 20 may determine whether an OTP number generated using the card security code and the eigen value extracted from the storage location of the real card number at a time when a virtual card number is received is identical to the OTP number received from the virtual card number generating means 10 to verify the virtual card number generating means 10.

Further, as another embodiment, the virtual security code may be reflected in generating a first code and a second code without outputting the first card number generating means 10 to the outside. As shown in FIG. 14, the virtual card number generating means 10 may generate a first code of a count in which a virtual security code value generated based on an eigen value and a card security code in the virtual card number generating device 100 is added to a time when a card number is issued and may generate a second code of a count corresponding to the virtual security code value. In other words, the first code and the second code may be generated based on a count shifted by the virtual security code value from time A when a real card number is issued to a virtual card number generating device A. The count shifted from time A may be a count before or after a count corresponding to a current time depending on the generated virtual security code. The virtual card number verifying means 20 may apply received first and second codes to a storage location search algorithm to search for a point to which a storage location of a real card number is matched. Thus, since it is impossible for others to verify an order where the first code and the second code configuring the virtual card number are provided, security may be enhanced. Further, as another embodiment, the virtual card number verifying means 20 may extract the virtual security code from the second code generated based on the virtual security code and may verify whether there is a value identical to a virtual security code among OTP numbers calculated after a count in a specific range from a count in which a virtual card number is received is input, using a virtual security code generation function (i.e., an OTP function). The virtual card number verifying means 20 may apply an inverse function of a second function to the second code to obtain a virtual security code value (i.e., an OTP function value) used to generate the second code and may search for a count in which the same value as the virtual security code value is calculated. As there is a difference between a time when a virtual security code is generated at the virtual card number generating means 10 by a transmission time or delay of a virtual card number and a time when the virtual security code is received at the virtual card number verifying means 20, a count in which the virtual card number is received may fail to be identical to a count in which an OTP number corresponding to the virtual security code is generated. Therefore, the virtual card number verifying means 20 may permit an error range from the count in which the virtual card number is received. Thus, since it is possible for the virtual card number verifying means 20 to verify whether the virtual card number generating means 10 which transmits the virtual card number is normally matched to a real card number, security may be enhanced. Further, although a user does not enter a virtual security code of specific digits when entering a virtual card number, since the virtual card number verifying means 20 searches for the virtual security code itself and verifies the virtual card number generating means 10, it may simply use the virtual card number generating means 10.

Further, as another embodiment, the virtual card number generating means 10 may generate a first code corresponding to a count in which a virtual security code value generated based on an eigen value and a card security code in the virtual card number generating device 100 is added to a time when a financial transaction is requested and may generate a second code corresponding to a count in which a count difference between a time (A time) when a real card number is issued and a time (C time) when a financial transaction request is received is added to the virtual security code value. In other words, a formula of generating the first code and the second code at the virtual card number generating means 10 is described hereafter.

First code=$f_1$ (count at time C+virtual security code)

Second code=$f_2$ (count at time C−count at time A+virtual security code)

(Time A: a time when a real card number is issued, time C: a count of a time when a financial transaction request is received, and a virtual security code: an OTP number)

The virtual card number verifying means 20 may search for a storage location of a real card number based on the first code and the second code in a received virtual card number and may extract a card security code (e.g., a CVV or CVC) and an eigen value of the virtual card number generating device 100 from the storage location of the real card number. The virtual card number verifying means 20 may generate a virtual security code (i.e., an OTP number) in a specific count range from a time (time C) when a financial transaction request is received, based on the card security code and the eigen value. Thereafter, the virtual card number verifying means 20 may verify whether there is a count, such as the number of counts from a time (time A) when a real card number is issued to each count in the specific count range from the time (time C) when the financial transaction request is received and the number of counts in which the sum of virtual security codes (i.e., OTP numbers) corresponds to the second code (i.e., a value in which an inverse function of a second function is applied to the second code). As the virtual card number verifying means 20 searches for a point matched to a storage location of the real card number based on the first code and the second code, it may determine the time (time A) when the real card number is issued. Thus, the virtual card number verifying means 20 may verify whether a virtual card number is normally issued by the virtual card number generating means 10.

Further, as another embodiment, as shown in FIG. 15, the method for providing the financial transaction by the virtual card number may further include, if a request to cancel the financial transaction is received from the specific virtual card number generating means 10, receiving (S1300) a virtual card number corresponding to a count in which financial transaction cancellation is requested to the virtual card number generating means 10, searching (S1400), by the virtual card number verifying means 20, for a real card number corresponding to the virtual card number, and cancelling (S1500) a previous financial transaction for the real card number. In general, if a virtual card number is used upon a financial transaction, since it is difficult to re-search for the virtual card number which performs payment, it is difficult to cancel card payment. In an embodiment of the inventive concept, although different virtual card numbers are issued upon card payment and upon card payment cancellation, since the virtual card numbers are virtual card numbers generated by the same virtual card number generating means 10, the virtual card numbers may be connected to the same real card number. Thus, a real card number which proceeds with payment may be easily searched using a virtual card number provided upon payment cancellation.

In other words, in operation S1300, the virtual card number verifying means 20 may receive a virtual card number (i.e., a second virtual card number) generated by the virtual card number generating means 10 at a time when payment is cancelled. In operation S1400, the virtual card number verifying means 20 may search for a real card number corresponding to the second virtual card number. The same manner as operation S1000 of searching for the real card number to proceed with a financial transaction may be applied to the manner of searching for the real card number. In operation S1500, the virtual card number verifying means 20 may cancel card payment based on the found real card number. Although the virtual card number verifying means 20 does not search for a virtual card number (i.e., a first virtual card number) which is used upon executing a financial transaction (i.e., upon card payment), since its searches for a real card number by which the financial transaction is executed using the second virtual card number, it may proceed with cancelling the financial transaction.

The above-mentioned method for providing the financial transaction by the virtual card number according to an embodiment of the inventive concept may be implemented with a program (or an application) to be combined with a computer which is hardware and be executed and may be stored in a medium.

According to the situation, the expression "configured to" used herein may be used interchangeably with the expression "suitable for", "having the capacity to", "designed to", "adapted to", "made to", or "capable of". The term "configured to" does not mean only "specifically designed to" in hardware. Instead, the expression "a device configured to" may mean that the device is "capable of" operating together with another device or other components. For example, a "processor configured to perform A, B, and C" may mean a dedicated processor (e.g., an embedded processor) for performing a corresponding operation or a generic-purpose processor (e.g., a central processing unit (CPU) or an application processor) which may perform corresponding operations by executing one or more software programs which are stored in a memory device.

The terminology "module," "terminal," "server" or "device" used herein may mean a unit including one of hardware, software, and firmware or two or more combinations thereof. The term "module," "terminal," "server" or "device" may be interchangeably used with the terms "unit", "logic", "logical block", "component", "circuit", and the like. The "module," "terminal," "server" or "device" may be a minimum unit of an integrated component or a part thereof. The "module," "terminal," "server" or "device" may be a minimum unit performing one or more functions or a part thereof. The "module," "terminal," "server" or "device" may be mechanically or electronically implemented. For example, the "module," "terminal," "server" or "device" may include at least one of an application-specific integrated circuit (ASIC) chip, field-programmable gate arrays (FPGAs), or a programmable-logic device, which is well known or will be developed in the future, for performing certain operations.

At least part of the electronic device (e.g., "module," "terminal," "server" or "device") or a method (e.g., operations) of the electronic device may be implemented with instructions stored in computer-readable storage media which have a program module. When the instructions are executed by a processor, one or more processors may perform functions corresponding to the instructions. The computer-readable storage media may be a memory.

The computer-readable storage media may include a hard disc, a floppy disk, magnetic media (e.g., a magnetic tape), optical media (e.g., a compact disc read only memory (CD-ROM) and a DVD), magneto-optical media (e.g., a floptical disk), a hardware device (e.g., a ROM, a random access memory (RAM), a flash memory, and the like), and the like. Also, the program instructions may include not only mechanical codes compiled by a compiler but also high-level language codes which may be executed by a computer using an interpreter. The above-mentioned hardware device may be configured to operate as one or more software modules to perform operations according to various embodiments of the present disclosure, and vice versa.

The above-described embodiments of the present disclosure can be implemented in hardware, firmware or via the execution of software or computer code that can be stored in a recording medium such as a CD ROM, DVD, a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, flash, etc. that may store or receive software or computer code that when accessed and executed by the computer, processor or hardware implement the processing methods described herein.

The "module," "terminal," "server" or "device" may include a microprocessor or any suitable type of processing circuitry, such as one or more general-purpose processors (e.g., advanced reduced instruction set computing machine (ARM)-based processors), a digital signal processor (DSP), a programmable logic device (PLD), an application-specific integrated circuit (ASIC), a field-programmable gate array (FPGA), a GPU, a video card controller, etc. In addition, it would be recognized that when a general purpose computer accesses code for implementing the processing shown herein, the execution of the code transforms the general purpose computer into a special purpose computer for executing the processing shown herein. Any of the functions and steps provided in the drawings may be implemented in hardware, software or a combination of both and may be performed in whole or in part within the programmed instructions of a computer. In addition, as used herein, a processor or microprocessor may be implemented as hardware.

Embodiments of the present disclosure described and shown in the drawings are provided as examples to describe technical content and help understanding but do not limit the present disclosure. Accordingly, it should be interpreted that besides the embodiments listed herein, all modifications or modified forms derived based on the technical ideas of the present disclosure are included in the present disclosure. Accordingly, the scope of the present disclosure is defined not by the detailed description and embodiments, but by the following claims and their equivalents.

For the computer to read the program and execute the methods implemented with the program, the above-mentioned program may include a code coded into a computer language such as C, C++, Java, or a machine language readable through a device interface of the computer by a processor (CPU) of the computer. Such a code may include a functional code associated with a function and the like defining functions necessary for executing the methods and may include a control code associated with an execution procedure necessary for the processor of the computer to execute the functions according to a procedure. Further, such a code may further include a code associated with memory reference about whether additional information or media necessary for the processor of the computer to execute the functions is referred at any location (address number) of an internal or external memory of the computer. Further, if it is necessary for the processor of the computer to communicate with any computer or server located in a remote place to execute the functions, the code may further include a communication related code about how communication is performed with any computer or server located in a remote place using a communication module of the computer and whether to transmit and receive any information or media upon communication.

The medium may refer to a device-readable medium which stores data on a semi-permanent basis rather than a medium, such as a register, a cache, or a memory, which stores data during a short moment. In detail, the medium may be, for example, but is not limited to, a read only memory (ROM), a random access memory (RAM), a compact disc ROM (CD-ROM), a magnetic tape, a floppy disc, an optical data storage device, or the like. In other words, the program may be stored in various storage media on various servers accessible by the hardware or various storage media on the hardware of the user. The medium may be distributed to a computer system connected over a network and may store a computer-readable code on a distributed basis.

An embodiment of the inventive concept may have the following various effects.

First, since a virtual card number is newly generated per unit count and since a duplicated virtual card number does not appear in a predetermined entire period, a real card number may fail to be hacked when the virtual card number is hacked.

Second, since an algorithm for generating a virtual card number and searching for a real card number is added to only a virtual card number generating device and a virtual card number verifying device (e.g., a financial institution server), a conventional process using the real card number may be maintained without change. For example, if a virtual card number which is not duplicated and generated is generated and provided to a smart card or an app card, a POS device and a PG server may be maintained to transmit the virtual card number to a card issuer server and the card issuer server may search for a real card number corresponding to the virtual card number to proceed with payment. Thus, a portion which should be changed in a conventional process to enhance security may be minimized, and a user may fail to perform a separate stage for increasing security.

Lastly, since a virtual card number provided from the same virtual card number generating means is matched to a real card number irrespective of a generation time, a financial transaction may be easily cancelled using only a virtual card number changed for each count.

In addition, the combination of the steps of the method described in the present application operates in a non-conventional and non-generic way to ensure that the card holder's identity is verified in a secure manner that is more than the conventional verification process employed by a financial institution alone or by an ATM alone. In combination, these steps do not represent merely gathering data for comparison or security purposes, but instead set up a sequence of events that address unique problems associated with card numbers and ATMs (e.g., the use of stolen or "skimmed" bank cards and/or customer information to perform unauthorized transactions). Thus, the claimed combination of additional elements presents a specific, discrete implementation of the abstract idea. Further, the combination of obtaining information from the mobile communication device (instead of the ATM keypad or POS keypad) and using the image (instead of directly providing real card numbers) to verify the customer's identity by matching identification information does not merely select information by content or source, but instead describes a process that differs from the routine and conventional sequence of events normally conducted by card number verifications, such as entering a real card number, similar to the unconventional sequence of events. The method described in the present application thus represent significantly more (i.e., provide an inventive concept) because they are a practical implementation of the abstract idea of fraud prevention that performs identity verification in a non-conventional and non-generic way.

While the inventive concept has been described with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A smart card for providing a financial transaction by using a virtual card number, the smart card comprising:
 a display including at least one of a liquid crystal display, a thin film transistor-liquid crystal display, an organic light-emitting diode, a flexible display, and an electronic paper;
 a printed circuit board (PCB);
 an integrated circuit (IC) chip mounted on the PCB;
 a processor,
 wherein the processor is configured to:
  generate a virtual card number by combining a plurality of detailed codes, wherein:
   the plurality of detailed codes are selected according to a predetermined rule; and
   the plurality of detailed codes comprises:
    a first code indicating a start point for searching for a storage location of a real card number; and
    a second code indicating a search path from the start point to the storage location of the real card number according to a specific search scheme;
  generate the first code and the second code, respectively, by using a plurality of detailed code generation functions included in the virtual card number generation function, and automatically change the first code and the second code, respectively, as a predetermined time interval elapses; and
  visually output the virtual card number by controlling the display to display the virtual card number, wherein the display comprises at least one organic light emitting diode (OLED) and further wherein the display is configured to automatically update the virtual card number displayed on the display in real time by modifying the at least one OLED in response to the change of the first code and the second code, respectively, as the predetermined time interval elapses; and a non-transitory machine readable medium storing a virtual card number generation function and a rule of updating a virtual card number generation function.

2. The smart card of claim 1, wherein the virtual card number further comprises a virtual security code corresponding to digits of a card security code.

3. The smart card of claim 1, wherein, when the first code or the second code of N (N is a natural number) digits is generated with M (M is a natural number) characters, each of the plurality of detailed codes is matched to different $M^N$ codes, and wherein the virtual card number generation function comprises a first function or a second function for sequentially providing the first code or the second code depending on a specific matching rule.

4. The smart card of claim 3, wherein the first code is generated based on the predetermined time interval, which elapses from an initial time started to issue the real card number, and wherein the second code is generated based on the predetermined time interval, which elapses from a time when a separate real card number is issued.

5. The smart card of claim 1, further comprises:

a fixed code printed on a surface of the smart card, wherein the virtual card number is consisted of the fixed code and a remaining code, and wherein the display is configured to display the remaining code.

* * * * *